(12) United States Patent
Kashiki

(10) Patent No.: US 6,459,536 B2
(45) Date of Patent: Oct. 1, 2002

(54) ZOOM LENS SYSTEM, AND IMAGE PICKUP SYSTEM USING THE SAME

(75) Inventor: Yasutaka Kashiki, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 92 days.

(21) Appl. No.: 09/761,836

(22) Filed: Jan. 18, 2001

(30) Foreign Application Priority Data

Jan. 19, 2000 (JP) ........................................ 2000-009656

(51) Int. Cl.$^7$ ................................................ G02B 15/14
(52) U.S. Cl. ........................ 359/692; 359/690; 359/687; 359/688
(58) Field of Search ................................. 359/692, 690, 359/687–688

(56) References Cited

U.S. PATENT DOCUMENTS

| | | | |
|---|---|---|---|
| 5,109,299 A | 4/1992 | Kato | 359/692 |
| 5,144,489 A | 9/1992 | Shibayama | 359/689 |
| 5,777,800 A | 7/1998 | Yamaguchi et al. | 359/692 |
| 5,844,725 A | * 12/1998 | Itoh | 359/692 |
| 5,900,991 A | * 5/1999 | Kang | 359/676 |
| 5,986,821 A | * 11/1999 | Yoon | 359/692 |

FOREIGN PATENT DOCUMENTS

| | | |
|---|---|---|
| JP | 5-119258 | 5/1993 |
| JP | 9-96761 | 4/1997 |
| JP | 10-197793 | 7/1998 |

* cited by examiner

Primary Examiner—Georgia Epps
Assistant Examiner—M. Hasan
(74) Attorney, Agent, or Firm—Pillsbury Winthrop LLP

(57) ABSTRACT

The invention provides a compact, low-cost zoom lens system comprising a positive lens group and a negative lens group. The system comprises a first lens group G1 having positive refracting power and a second lens group G2 having negative refracting power. The second lens group comprises, in order from an object side thereof, a positive lens 2-1, a negative lens 2-2 and a negative lens 2-3. The lens 2-1 is a plastic lens. The second lens group G2 further satisfies:

$$1.05 \leq f_{21}/f_T < 5 \quad (1)$$

$$3.8 < f_{22}/f_{G2} < 8 \quad (2)$$

Here $f_{21}$ is the focal length of lens 2-1 in the second lens group, $f_{22}$ is the focal length of lens component 2-2 in the second lens group, $f_T$ is the focal length of the zoom lens system, and $f_{G2}$ is the composite focal length of the second lens group.

16 Claims, 15 Drawing Sheets

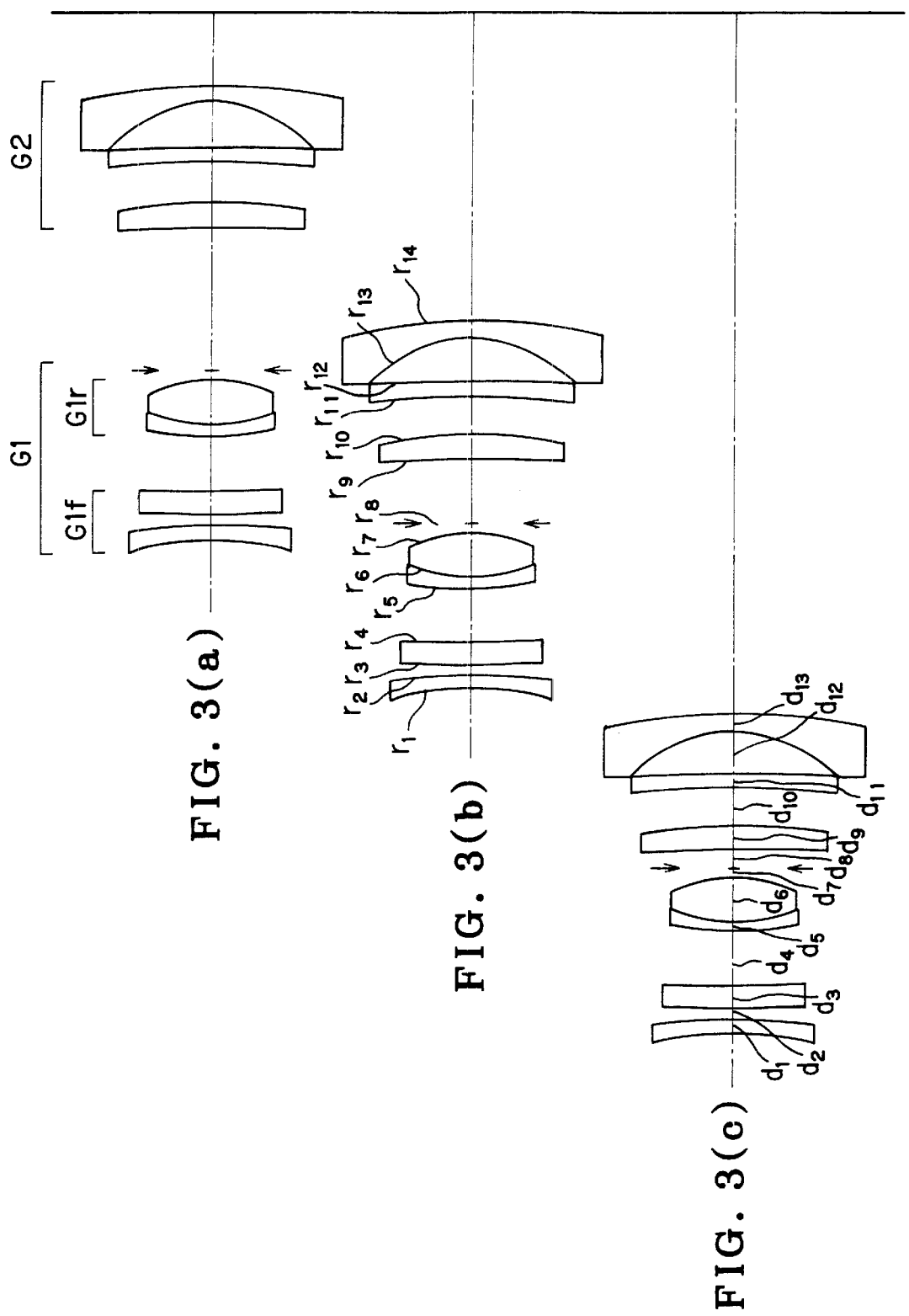

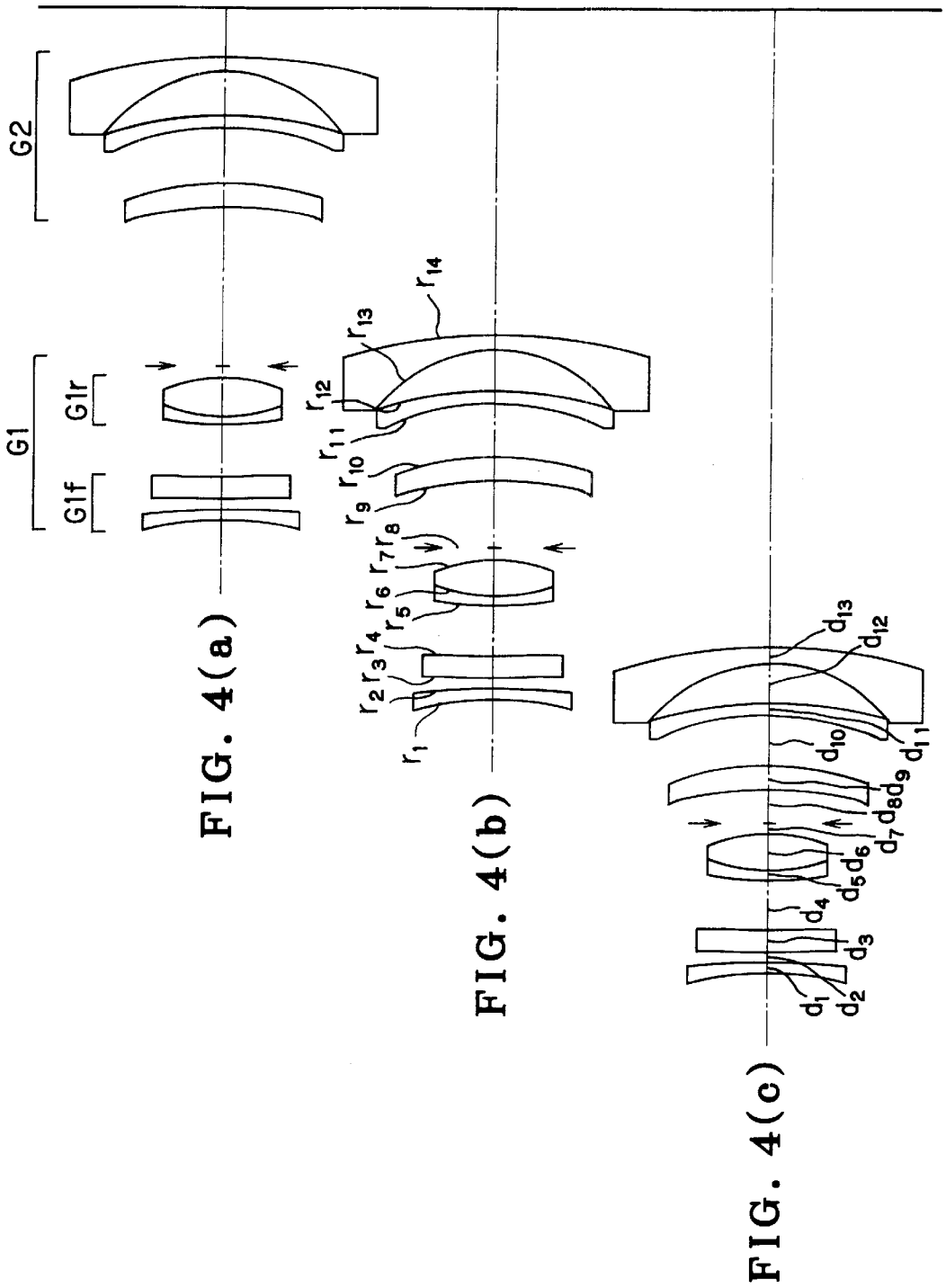

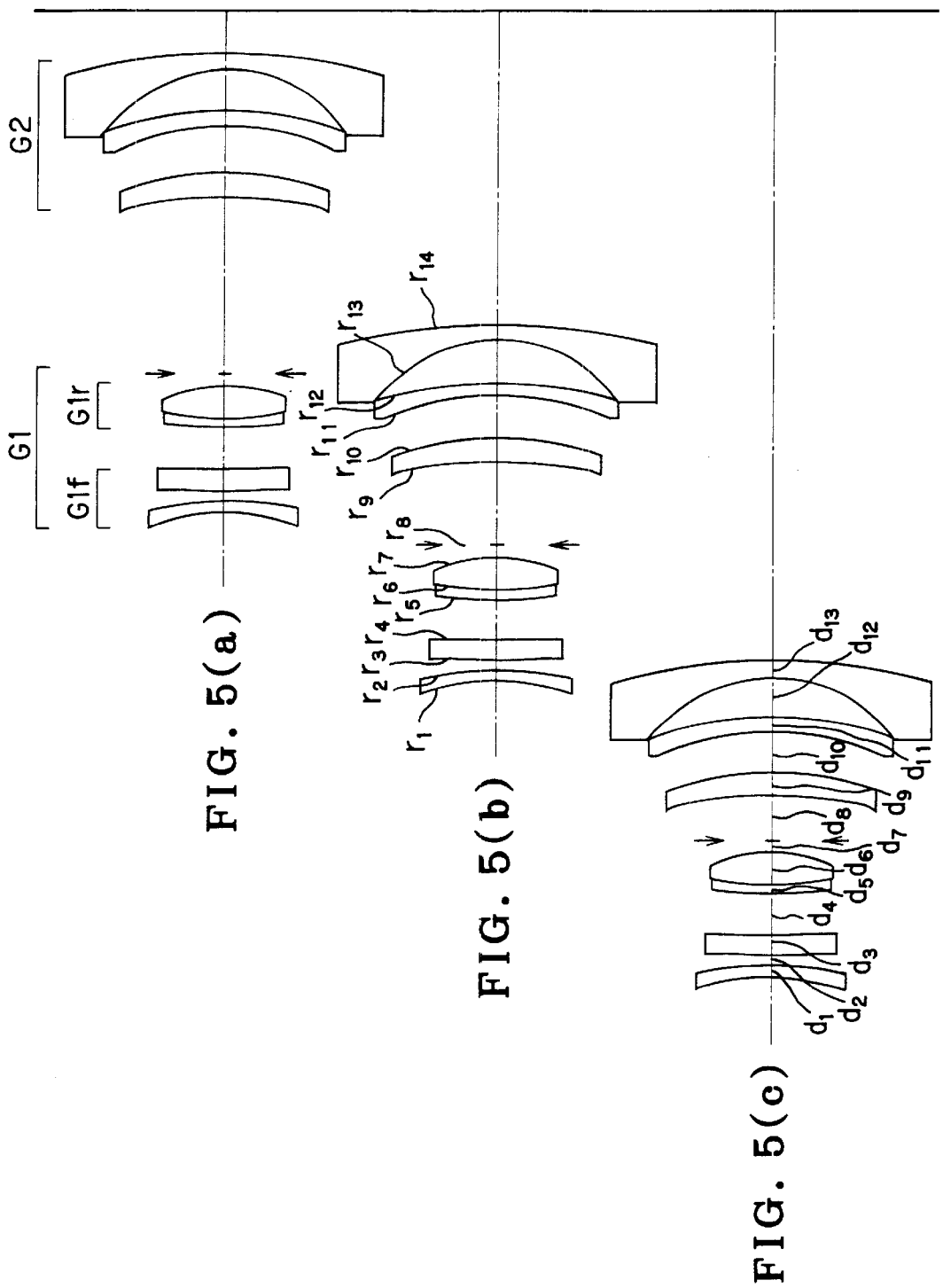

ZOOM LENS SYSTEM, AND IMAGE PICKUP SYSTEM USING THE SAME

This application claims benefit of Japanese Patent Application(s) No. 2000-9656 filed in Japan on Jan. 19, 2000, the contents of which are incorporated by this reference.

BACKGROUND OF THE INVENTION

So far, a number of zoom lens systems, each comprising two lens groups or a positive and a negative lens group, wherein the space between them is varied for zooming, have been known as effective arrangements for achieving size and cost reductions and capable of zooming with a simple mechanism. Recently developed zoom lens system are increasingly required to have higher zoom ratios than ever before. Prior zoom lens arrangements to meet such requirements are disclosed in JP-A's 9-90220, 9-96761, etc.

These arrangements comprising a relatively small number of lenses have a zoom ratio of 2 to 3, and some of them have a zoom ratio of 3 or greater. To reduce the number of lenses used, the second lens group is composed of two lenses or a positive and a negative lens (one of which is an aspherical lens). By making correction for aberrations in the second lens group, performance is maintained all over the zooming zone. However, there is severe degradation of performance due to decentration in the second lens group, because various aberrations are corrected with two lenses. In addition, the power of the second lens group must be increased because the overall negative power of the diverging second lens group is compensated for by the negative lens in the second lens group. This is unfavorable for correction of aberrations.

Referring to JP-A's 5-119258, 4-22911, etc., a compact yet wide-angle zoom lens system is disclosed. The second lens group is composed of three lenses or a positive, a negative and a negative lens so that various aberrations therein can be corrected. The power of the second lens group is allocated to the three lenses so that the degradation of performance due to decentration can be reduced. However, all three lenses are formed of glass, and so the second lens group is higher in cost than that made up of two lenses. In addition, the back focus is short. This does not only add mechanical constrains to the zoom lens system but also offers several problems such as transfer onto film of dust deposits on the surface of a lens in the vicinity of an image plane, an increase in the diameter of the rear lens, etc. The zoom ratio is far short of 2.

Referring to JP-A 3-267909, etc., the second lens is composed of three lenses or a positive, a negative and a negative lens, with the positive lens being formed of a plastic lens. A plastic lens is excellent in mass productivity, and so has the merit of achieving lower costs as compared with a glass lens. However, a problem with the plastic lens is that its refractive index and shape are prone to large variations depending on ambient temperatures. Accordingly, meticulous care must be taken when the plastic lens is used for a camera's phototaking optical system. To this end, it is often attempted to make the power of the plastic lens weak. However, such care is not found in the example of JP-A 3-267909 because the power of the plastic lens is still strong.

Referring then to JP-A's 5-119258, 10-197793, etc., the second lens group is composed of three lenses or a positive, a negative and a negative lens, with the positive lens being formed of a plastic lens, as is the case with JP-A 3-267909. In consideration of the changes of the plastic lens depending on ambient temperatures, the power of the plastic lens is made weak. However, when the power becomes too weak, the effect on correction of aberrations becomes slender. In addition, the principal point positions of the second lens group are shifted to the object side under the power of the second negative lens, resulting in problems such as a decreased back focus. For this reason, how the power of the second negative lens located at a middle position in the second negative lens is determined is important for power profile. The examples show that the power of the second negative lens group is still strong, resulting in a decreased back focus. This does not only add mechanical constrains to the zoom lens system but also offers several problems such as transfer onto film of dust deposits on the surface of a lens in the vicinity of an image plane, an increase in the diameter of the rear lens, etc. When the power of the second negative lens is too weak, on the other hand, the effect on correction of aberrations becomes slender; in other words, the merit of +−− construction is lost.

SUMMARY OF THE INVENTION

In view of such problems associated with the prior art, an object of the present invention is to provide a compact, low-cost zoom lens system of +− construction, which comprises two lens groups, and an image pickup system using the same.

According to one aspect of the invention, this object is achieved by the provision of a zoom lens system comprising, in order from an object side of the zoom lens system, a first lens group having positive refracting power and a second lens group having negative refracting power, wherein:

said second lens group comprises, in order from an object side thereof, a positive lens component 2-1, a negative lens component 2-2 and a negative lens component 2-3, with said lens component 2-1 comprising a plastic lens element, and said second lens group satisfies the following conditions (1) and (2):

$$1.05 \leq f_{21}/f_T < 5 \tag{1}$$

$$3.8 < f_{22}/f_{G2} < 8 \tag{2}$$

where $f_{21}$ is the focal length of the lens component 2-1 in the second lens group, $f_{22}$ is the focal length of the lens component 2-2 in the second lens group, $f_T$ is the focal length of the zoom lens system at a telephoto end thereof, and $f_{G2}$ is the composite focal length of the second lens group.

According to another aspect of the invention, there is provided a zoom lens system comprising, in order from an object side of the zoom lens system, a first lens group having positive refracting power and a second lens group having negative refracting power, wherein:

said second lens group comprises, in order from an object side thereof, a positive lens component 2-1, a negative lens component 2-2 and a negative lens component 2-3, with said lens component 2-1 comprising a plastic lens element, and said second lens group satisfies the following conditions (1), (2) and (4):

$$1.05 \leq f_{21}/f_T < 5 \tag{1}$$

$$3.8 < f_{22}/f_{G2} < 8 \tag{2}$$

$$1.01 \leq SG_{21} < 1.24 \tag{4}$$

where $f_{21}$ is the focal length of the lens component 2-1 in the second lens group, $f_{22}$ is the focal length of the lens component 2-2 in said second lens group, $f_T$ is the focal length of the zoom lens system at a telephoto end thereof, $f_{G2}$ is the composite focal length of the second lens group, and $SG_{21}$ is the specific gravity of the lens component 2-1 in the second lens group.

Why the aforesaid arrangements are used in the invention, and how they work is now explained.

According to the present invention, the zoom lens system comprises a first lens group having positive refracting power and a second lens group having negative refracting power. The second lens group then comprises a positive lens 2-1, a negative lens 2-2 and a negative lens 2-3. The positive lens 2-1 is formed of a plastic lens. This arrangement is of the simplest two-group construction in zoom lens constructions, and is constructed of the telephoto type so as to achieve size reductions on the telephoto side. By providing the diverging second lens group of +-- construction, and especially allocating the high proportion of negative refracting power to two lenses, it is possible to reduce the influence of decentration produced within the second lens group and make correction for aberrations, especially off-axis coma. By constructing the positive lens 2-1 of a plastic lens, size and weight reductions can be achieved.

Referring here to why the plastic lens is used for the lens 2-1 rather than for the lenses 2-2 and 2-3, the lens 2-1 is only the positive lens in the second lens group that has generally negative power, and so can be constructed with a relatively gentle power. In addition, the lens 2-1 is the outermost lens favorable for assembly control. For instance, a plastic lens is fabricated by an injection molding process that does not rely on the centering step needed for glass lenses. This is favorable in consideration of cost, but makes the surface of the lens prone to decentration with respect to the outside shape of the lens. For this reason, it is desired to control the decentration of the plastic lens during assembly. The control should then preferably be carried out with respect to the axes of other lenses forming the same group. This is the reason that the plastic lens should preferably be disposed at the outermost position. How to perform this control, for instance, is set forth in JP-A 6-265766.

Condition (1) provides a definition of the focal length ratio of the lens 2-1 with respect to the zoom lens system at the telephoto end. The outermost lens or plastic lens 2-1 varies in shape and refractive index with temperatures. Such variations occur largely at the telephoto end of the zoom lens system, and have some considerable influences on image-formation capabilities and focal shifts as well. When the lower limit of 1.05 to this condition is not reached, the focal length of the lens 2-1 becomes short (or the refracting power thereof increases strong), resulting in unacceptably large changes of the focal length due to temperature, etc. When the upper limit of 5 is exceeded, the focal length of the lens 2-1 becomes too long to make correction for aberrations, especially chromatic aberrations. This phenomenon becomes perceptible with increasing zoom ratios.

It is here noted that the lower and upper limits to condition (1) may be 1.3 and 3.5, respectively.

Condition (2) provides a definition of the ratio of the focal length of the lens 2-2 with respect to the composite focal length of the second lens group. To satisfy this condition, the combined negative power of the lenses 2-2 and 2-3 must be stronger than the overall negative power of the rear lens group (the second lens group). Basically, positive and negative powers are allocated to the object and image sides of the second lens group, respectively, so that the principal points thereof can be positioned on the object side. By meeting condition (2) in consideration of such requirements, it is possible to ensure the preferable positions for the principal points of the second lens group, and make correction for aberrations of the lens 2-2 in particular. To be more specific, when the lower limit 3.8 to condition (2) is not reached, the proportion of the refracting power of the lens 2-2 in the second lens group becomes large, and so the principal points of the second lens group are shifted toward the object side in the second lens group; that is, the second lens group is as a whole positioned on the image plane side of the zoom lens system. This makes it difficult to ensure any satisfactory back focus. The reduced back focus does not only add mechanical constrains to the zoom lens system but also offers problems such as lens diameter increases, transfer onto film of dust deposits on lens surfaces, etc. When the upper limit of 8 is exceeded, the refracting power of the lens 2-2 becomes too weak to make effective correction for aberrations.

It is here noted that the upper and lower limits to condition (2) may be 5.0 and 7.4, respectively.

By meeting such requirements as mentioned above, it is possible to achieve a compact, low-cost zoom lens system.

In the zoom lens system of such construction as described above, the first lens group comprises, in order from an object side thereof, a front lens unit comprising a negative lens 1-1 and a positive lens 1-2 and having negative refracting power and a rear lens group comprising a positive lens. Preferably in this case, the lens 1-2 is a plastic lens comprising an aspherical surface whose off-axis power is smaller than axial power.

By the wording "aspherical surface whose off-axis power is smaller than axial power" used herein is intended an aspherical surface including a surface region wherein, when the axial power is positive power, the off-axis power is smaller than that, and an aspherical surface including a surface region wherein, when the axial power is negative power, the off-axis negative power is stronger than that.

Since the power profile of the first lens group is of the −+ retrofocus type, it is possible to locate the principal points in the first lens group in the rear of the first lens group and so ensure some space between the first and second lens group even at the telephoto end of the zoom lens system. To ensure high zoom ratios, it is essentially required to make good correction for various aberrations within each lens group. However, the first lens group comprises a smaller number of lenses with a large proportion of the positive power allocated to the rear unit, and so the first lens group remains under-corrected. To compensate for this, it is required to use an aspherical surface having negative power that becomes strong at locations off the axis. In consideration of cost, it is preferable to use a plastic aspherical lens because a glass aspherical lens costs much. Since the aspherical surface used is designed to have negative power at locations off the axis, it is preferable to make use of positive paraxial power because fluctuations of focal length with temperature changes can be mutually compensated for within the single lens, so that the fluctuations of focal length with temperature can be reduced.

Preferably, thus constructed zoom lens system should further meet condition (3) given below.

$$1 < (R_{22r} + R_{23f})/(R_{22r} - R_{23f}) < 2.5 \tag{3}$$

Here $R_{22r}$ is the image-side radius of curvature of the lens 2-2 in the second lens group, and $R_{23f}$ is the object-side radius of curvature of the lens 2-3 in the second lens group.

Condition (3) provides a definition of the shape factor of an air lens formed between the lenses 2-2 and 2-3. When the lower limit of 1 is not reached, it is required to allow an air space between the lenses 2-2 and 2-3, thereby preventing their interference, resulting in an increase in the axial center thickness of the two lens groups and an increase in the thickness of the collapsible mount. In turn, this does not only form an obstacle to size reductions, but also causes the back focus to become short because the principal point positions of the second lens group are shifted toward the object side under the refracting power of the lens 2-2. Exceeding the upper limit of 2.5 to condition (3) means that the air lens defined between the lenses 2-2 and 2-3 takes a meniscus form having close radii of curvature. In other words, at a location off the axis of the air lens, surfaces having close radii of curvature are disposed close to each other. Consequently, light rays reflected at the object-side surface of the lens 2-3, and especially at the periphery of that surface, are reflected at the image-side surface of the lens 2-2. The thus reflected light rays then arrive at an effective screen, yielding ghost or flare components that are harmful to images.

It is here noted that lower and upper limits to condition (3) may be 1.8 and 2.3, respectively.

According to another aspect of the present invention, there is provided a zoom lens system comprising, in order from an object side of the zoom lens system, a first lens group having positive refracting power and a second lens group having negative refracting power, wherein:

said second lens group comprises, in order from an object side thereof, a positive lens 2-1, a negative lens 2-2 and a negative lens 2-3, with said lens 2-1 comprising a plastic lens element, and said second lens group satisfies the following conditions (1), (2) and (4):

$$1.05 \leq f_{21}/f_T < 5 \quad (1)$$

$$3.8 < f_{22}/f_{G2} < 8 \quad (2)$$

$$1.01 \leq S_{G21} < 1.24 \quad (4)$$

where $f_{21}$ is the focal length of the lens 2-1 in the second lens group, $f_{22}$ is the focal length of the lens 2-2 in the second lens group, $f_T$ is the focal length of the zoom lens system at a telephoto end thereof, $f_{G2}$ is the composite focal length of the second lens group, and $S_{G21}$ is the specific gravity of the lens 2-1 in the second lens group.

According to this aspect, too, the zoom lens system comprises a first lens group having positive refracting power and a second lens group having negative refracting power. The second lens group then comprises a positive lens 2-1, a negative lens 2-2 and a negative lens 2-3. The positive lens 2-1 is formed of a plastic lens. This arrangement is of the simplest two-group construction in zoom lens constructions, and is constructed of the telephoto type so as to achieve size reductions on the telephoto side. By providing the diverging second lens group of +−− construction, and especially allocating the high proportion of negative refracting power to two lenses, it is possible to reduce the influence of decentration produced within the second lens group and make correction for aberrations, especially off-axis coma. By constructing the positive lens 2-1 of a plastic lens, size and weight reductions can be achieved.

Referring here to why the plastic lens is used for the lens 2-1 rather than for the lenses 2-2 and 2-3, the lens 2-1 is only the positive lens in the second lens group that has generally negative power, and so can be constructed with a relatively gentle power. In addition, the lens 2-1 is the outermost lens favorable for assembly control. For instance, a plastic lens is fabricated by an injection molding process that does not rely on the centering step needed for glass lenses. This is favorable in consideration of cost, but makes the surface of the lens prone to decentration with respect to the outside shape of the lens. For this reason, it is desired to control the decentration of the plastic lens during assembly. The control should then preferably be carried out with respect to the axes of other lenses forming the same group. This is the reason that the plastic lens should preferably be disposed at the outermost position. How to perform this control, for instance, is set forth JP-A 6-265766.

Condition (1) provides a definition of the focal length ratio of the lens 2-1 with respect to the zoom lens system at the telephoto end. The outermost lens or plastic lens 2-1 varies in shape and refractive index with temperatures. Such variations occur largely at the telephoto end of the zoom lens system, and have some considerable influences on image-formation capabilities and focal shifts as well. When the lower limit of 1.05 to this condition is not reached, the focal length of the lens 2-1 becomes short (or the refracting power thereof increases strong), resulting in unacceptably large changes of the focal length due to temperature, etc. When the upper limit of 5 is exceeded, the focal length of the lens 2-1 becomes too long to make correction for aberrations, especially chromatic aberrations. This phenomenon becomes perceptible with increasing zoom ratios.

It is here noted that the lower and upper limits to condition (1) may be 1.3 and 3.5, respectively.

Condition (2) provides a definition of the ratio of the focal length of the lens 2-2 with respect to the composite focal length of the second lens group. To satisfy this condition, the combined negative power of the lenses 2-2 and 2-3 must be stronger than the overall negative power of the rear lens group (the second lens group). Basically, positive and negative powers are allocated to the object and image sides of the second lens group, respectively, so that the principal points thereof can be positioned on the object side. By meeting condition (2) in consideration of such requirements, it is possible to ensure the preferable positions for the principal points of the second lens group, and make correction for aberrations of the lens 2-2 in particular. To be more specific, when the lower limit 3.8 to condition (2) is not reached, the proportion of the refracting power of the lens 2-2 in the second lens group becomes large, and so the principal points of the second lens group are shifted toward the object side in the second lens group; that is, the second lens group is as a whole positioned on the image plane side of the zoom lens system. This makes it difficult to ensure any satisfactory back focus. The reduced back focus does not only add mechanical constrains to the zoom lens system but also offers problems such as lens diameter increases, transfer onto film of dust deposits on lens surfaces, etc. When the upper limit of 8 is exceeded, the refracting power of the lens 2-2 becomes too weak to make effective correction for aberrations.

It is here noted that the upper and lower limits to condition (2) may be 5.0 and 7.4, respectively.

Condition (4) provides a definition of the specific gravity of the plastic lens 2-1. As already explained, a plastic lens can contribute to weight reductions because of being smaller in specific gravity than a glass lens. With size reductions of a camera, weight reductions of lenses, too, provide effective means for saving the power and energy of a built-in motor.

With the second embodiment of the present invention, too, a compact, low-cost zoom lens system can be achieved by meeting such requirements as mentioned above.

Preferably, the front lens unit in the first lens group should consist of, in order from an object side thereof, a negative meniscus lens element and a positive meniscus lens element convex on an object side thereof.

Preferably, the rear lens unit in the first lens group should consist of a positive double-convex lens component.

Preferably, the second lens group should consists of, in order from an object side thereof, a positive meniscus lens element concave on an object side thereof, a negative lens element concave on an object side thereof and a negative meniscus lens element concave on an object side thereof.

It is thus possible to construct a high-performance zoom lens system of a reduced number of lenses.

Preferably in view of processability and correction of aberrations, aspherical surfaces should be used at the object-side surface of the lens component 1-2 in the first lens group and the object-side surface of the lens component 2-1 in the second lens group.

When an aspherical surface is used at the object-side surface of the lens component 1-2 in the first lens group, it should preferably have positive power on the optical axis, and be configured in such a way as to have a point of inflexion on section including the optical axis.

Preferably, a stop designed to move together with the first lens group during zooming should be disposed between the first and second lens groups.

Upon zooming from the wide-angle end to the telephoto end of the zoom lens system, both the first and second lens groups should preferably move toward the object side of the zoom lens system with a varying separation between them.

Of groups comprising lenses, only the first and second lens groups should preferably move upon zooming from the wide-angle end to the telephoto end, with a zoom ratio of 2.5 or greater. More preferably, the zoom ratio should be 3.1 or greater.

According to a further aspect of the present invention, the zoom lens system of the present invention may be used as an image pickup device to construct an image pickup system comprising a viewing device for viewing an image formed by the zoom lens system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a), 3(b) and 3(c) are sectional views, similar to FIGS. 1(a), 1(b) and 1(c), of Example 3 of the zoom lens system according to the invention.

FIGS. 4(a), 4(b) and 4(c) are sectional views, similar to FIGS. 1(a), 1(b) and 1(c), of Example 4 of the zoom lens system according to the invention.

FIGS. 5(a), 5(b) and 5(c) are sectional views, similar to FIGS. 1(a), 1(b) and 1(c), of Example 5 of the zoom lens system according to the invention.

DESCRIPTION OF THE PREFERRED EMBODIMENTS

The zoom lens system of the present invention is now explained with reference to Examples 1 to 9. FIGS. 1(a), 1(b) and 1(c) through 5(a), 5(b) and 5(c) are sectional views of the lens arrangements of Examples 1 to 5 at the wide-angle ends, intermediate settings and telephoto ends thereof, respectively. It is noted that sectional views of the lens arrangements of Examples 6 to 9 are omitted, and numerical data on each example will be enumerated later.

EXAMPLE 1

Figures 1A, 1B, 1C:
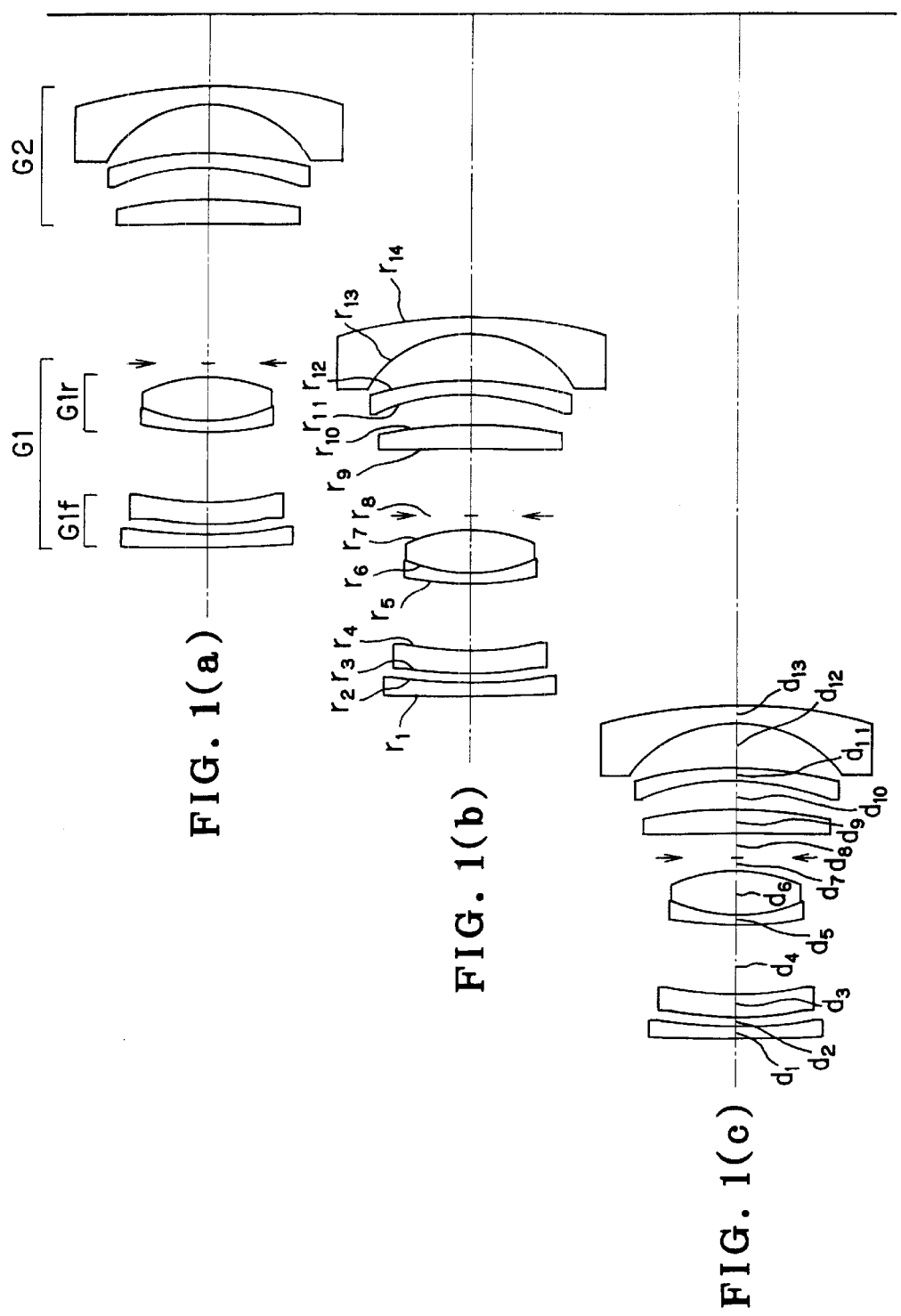
FIGS. 1(a), 1(b) and 1(c) are sectional views of Example 1 of the zoom lens system according to the invention at a wide angle end, an intermediate setting and a telephoto end thereof, respectively.

This example is directed to a zoom lens system having a focal length of 39.33 to 115.80 mm and an F-number of 3.80 to 11.18. As shown in FIGS. 1(a) to 1(c), the zoom lens system is composed of a first lens group G1 having positive refracting power and a second lens group G2 having negative refracting power. From the wide-angle end to the telephoto end of the zoom lens system, the first lens group G1, and the second lens group G2 moves toward the object side of the zoom lens system while the space between them becomes narrow.

The first lens group G1 is made up of a front lens unit G1f consisting of a negative meniscus lens convex on an object side thereof and a positive meniscus lens convex on an object side thereof, a rear lens unit G1r composed of a doublet consisting of a negative meniscus lens convex on an object side thereof and a double-convex lens, and an aperture stop. The second lens group G2 is made up of a positive meniscus lens, a negative meniscus lens and a negative meniscus lens, each concave on an object side thereof. Two aspherical surfaces are used; one at the object-side surface of the positive meniscus lens in the front lens unit G1f in the first lens group G1, and another at the object-side surface of the positive meniscus lens in the second lens group G2.

EXAMPLE 2

Figures 2A, 2B, 2C:
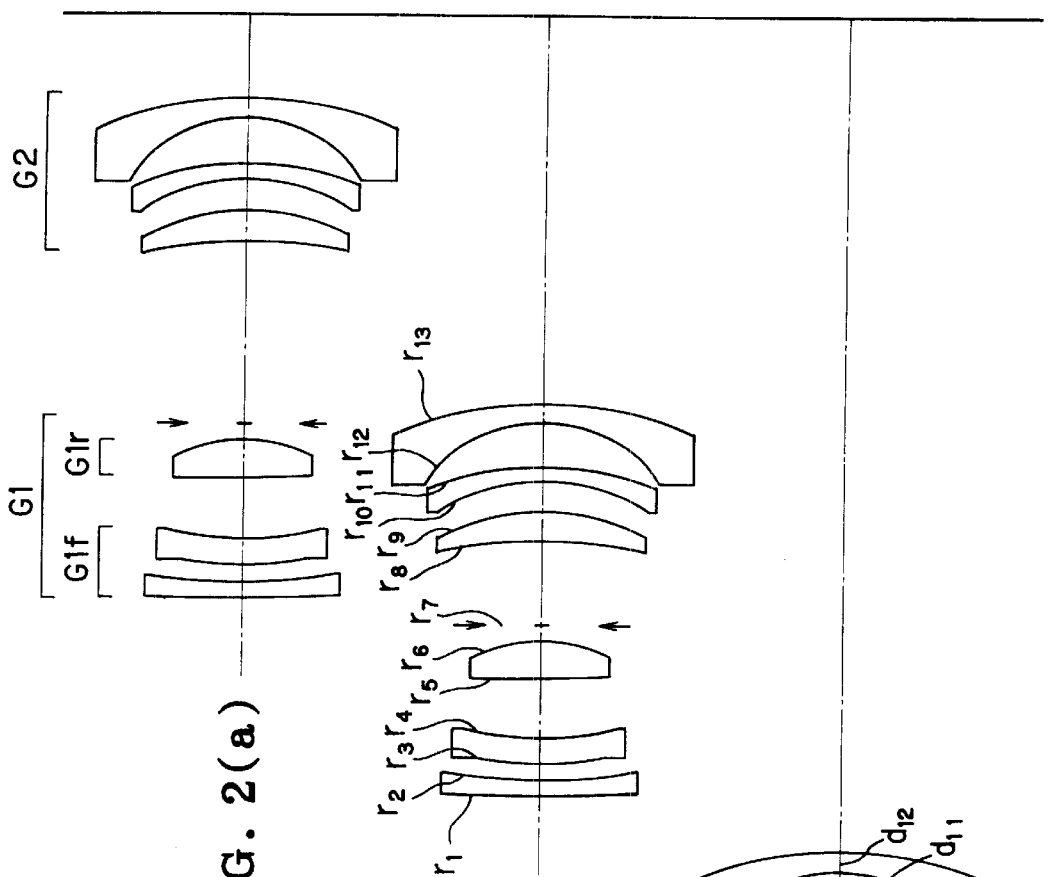
FIGS. 2(a), 2(b) and 2(c) are sectional views, similar to FIGS. 1(a), 1(b) and 1(c), of Example 2 of the zoom lens system according to the invention.
Figure 6A:
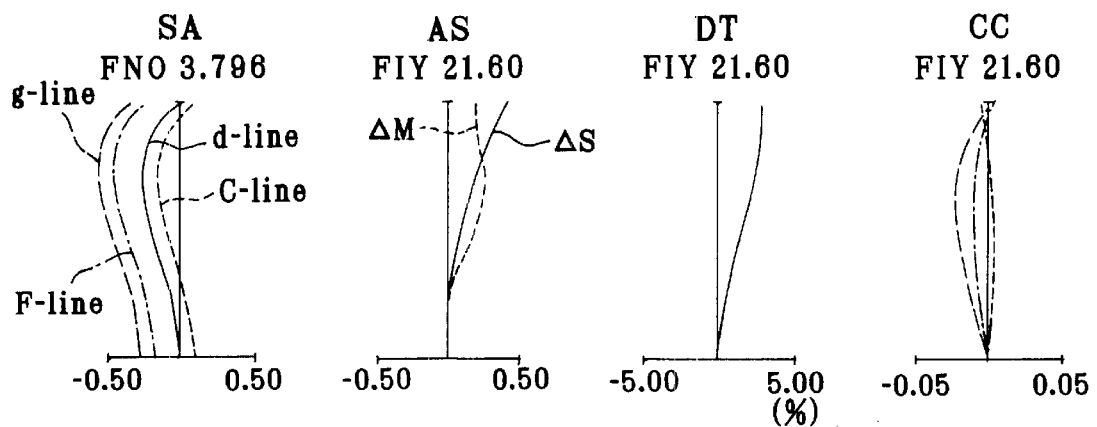
FIGS. 6(a), 6(b) and 6(c) are aberration diagrams for Example 1 upon focused at infinity.
Figure 6B:
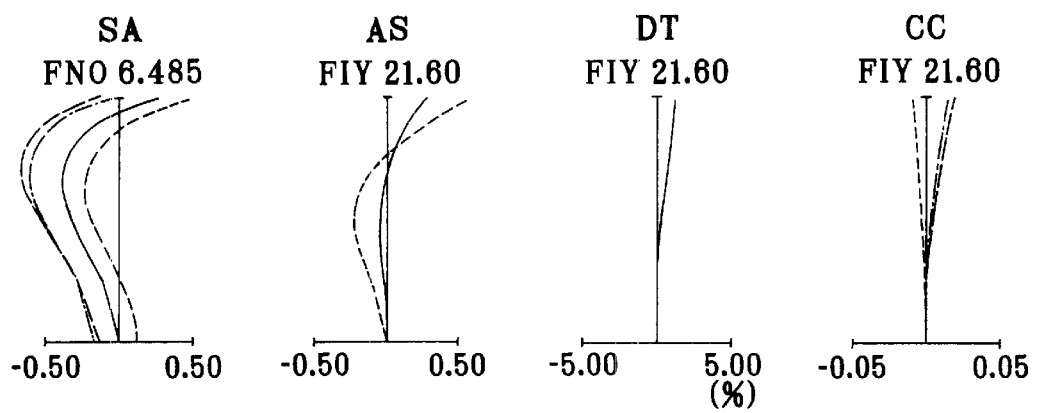
Figure 6C:
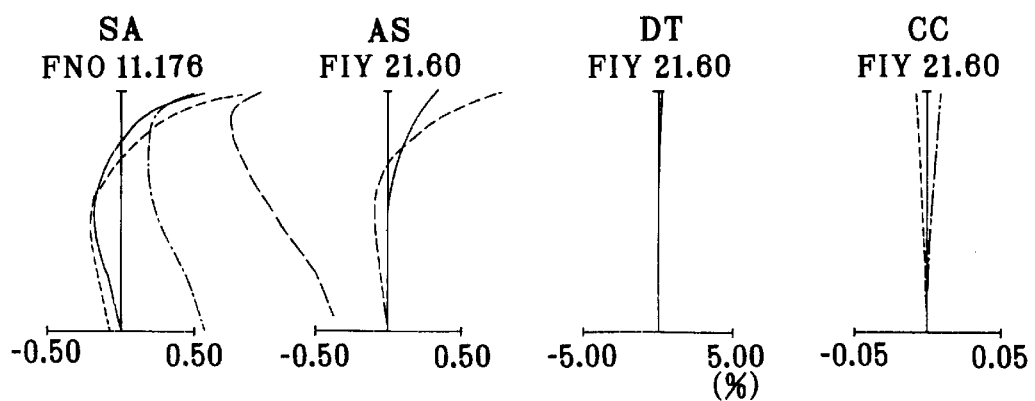
Figure 7A:
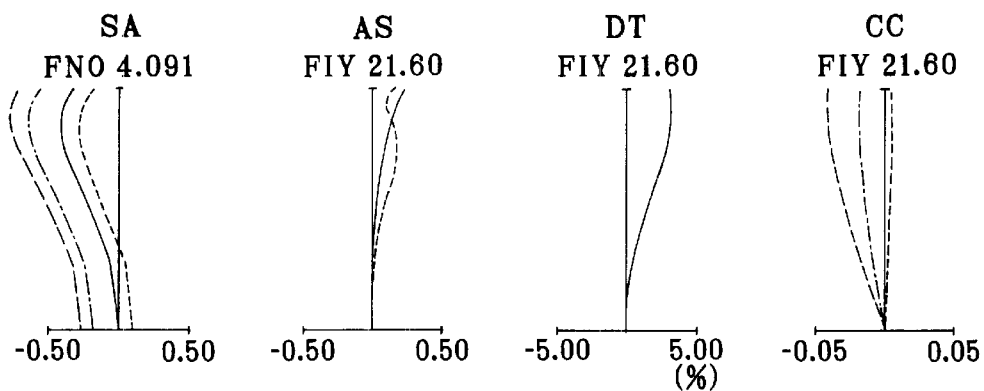
FIGS. 7(a), 7(b) and 7(c) are aberration diagrams for Example 2 upon focused at infinity.
Figure 7B:
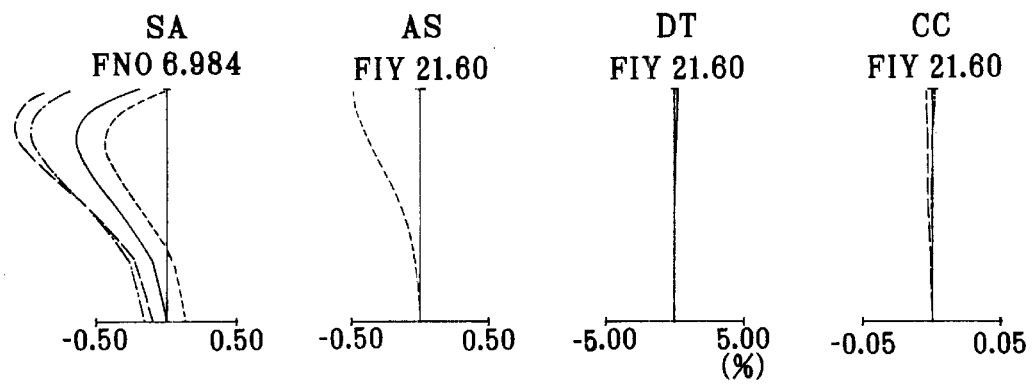
Figure 7C:
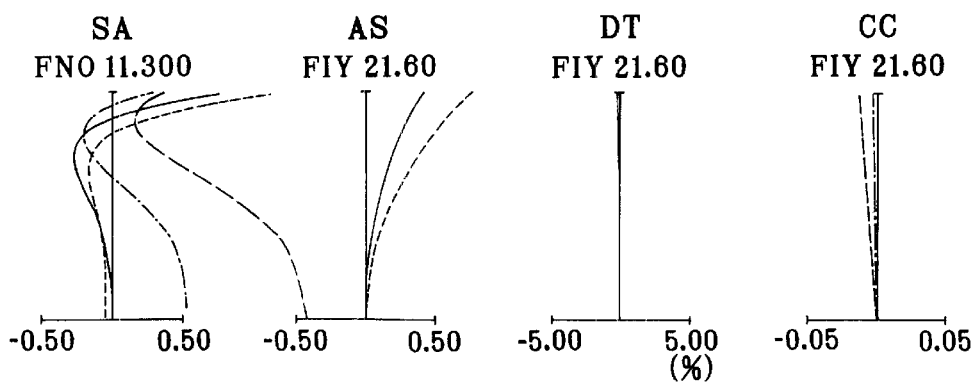
Figure 8A:
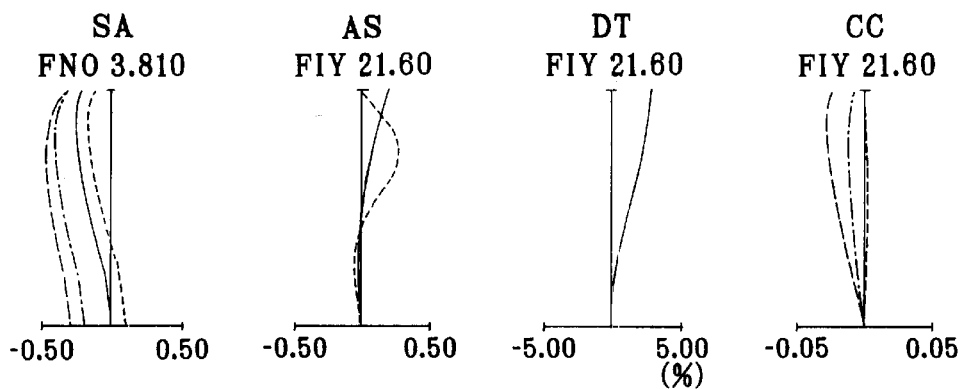
FIGS. 8(a), 8(b) and 8(c) are aberration diagrams for Example 3 upon focused at infinity.
Figure 8B:
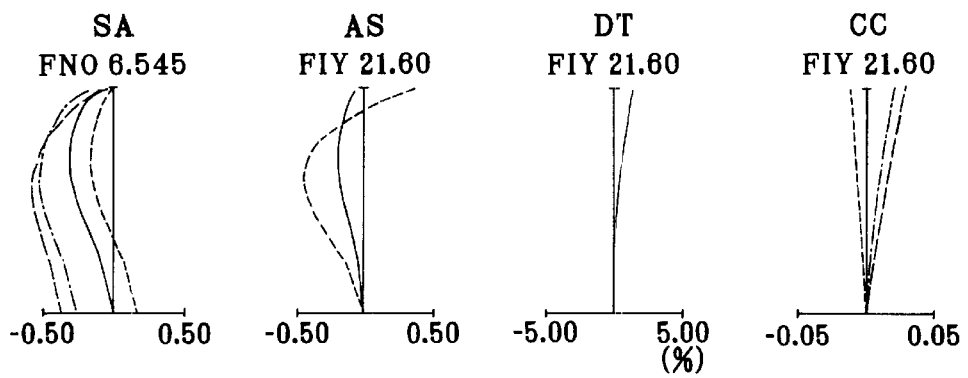
Figure 8C:
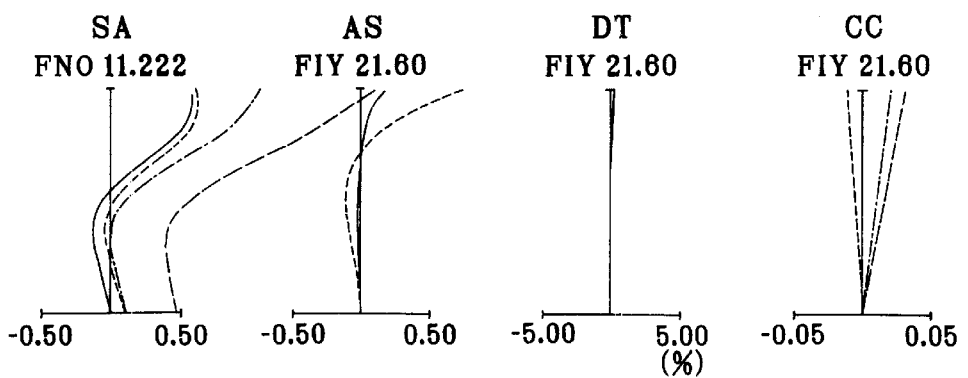
Figure 9A:
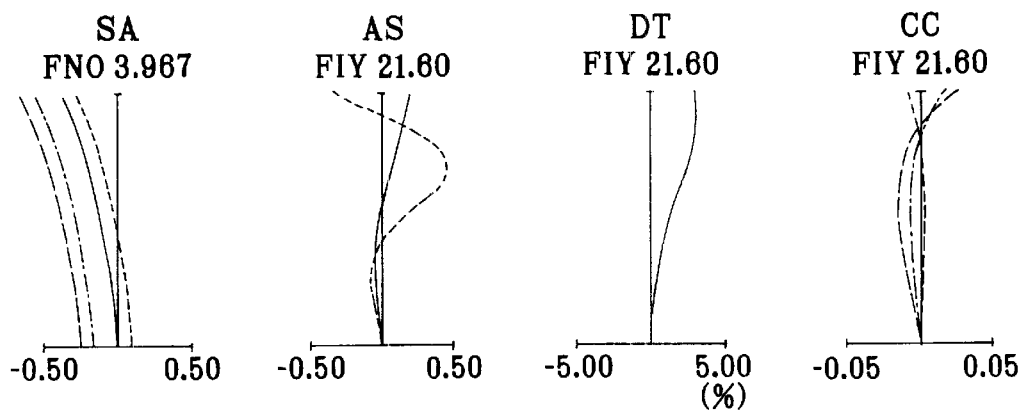
FIGS. 9(a), 9(b) and 9(c) are aberration diagrams for Example 4 upon focused at infinity.
Figure 9B:
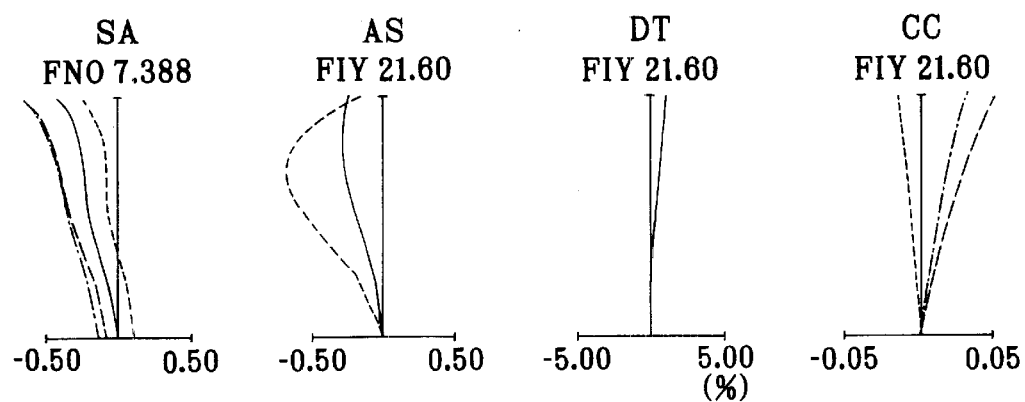
Figure 9C:
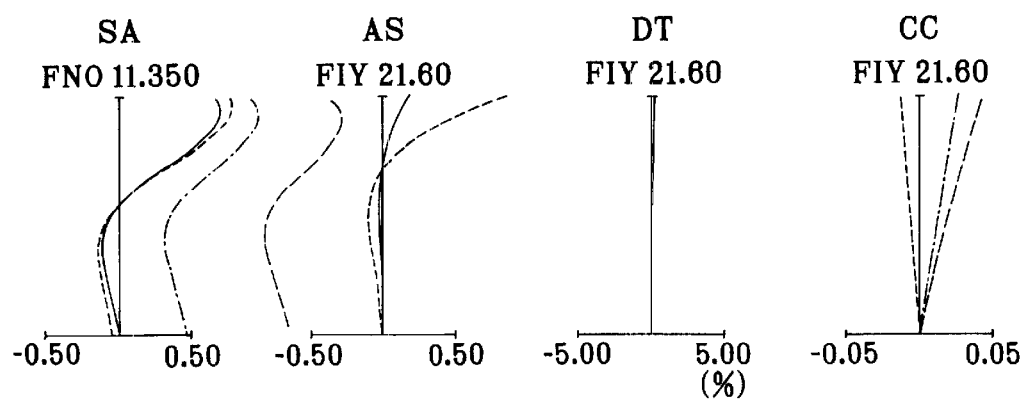
Figure 10A:
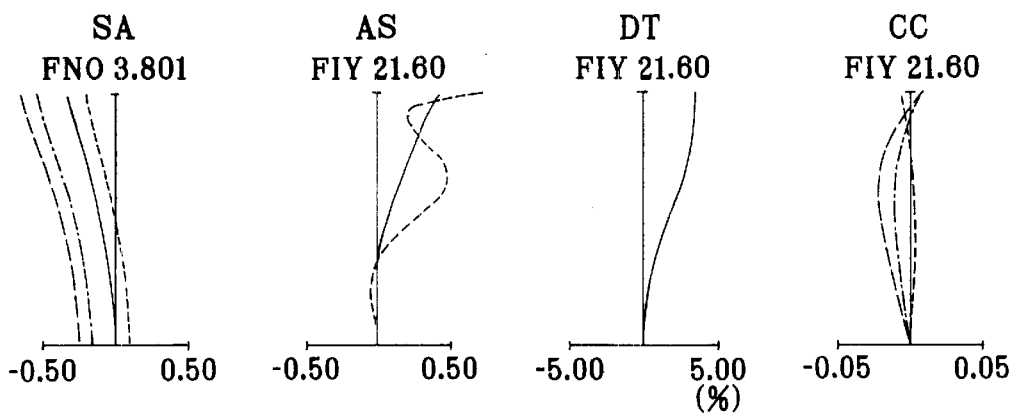
FIGS. 10(a), 10(b) and 10(c) are aberration diagrams for Example 5 upon focused at infinity.
Figure 10B:
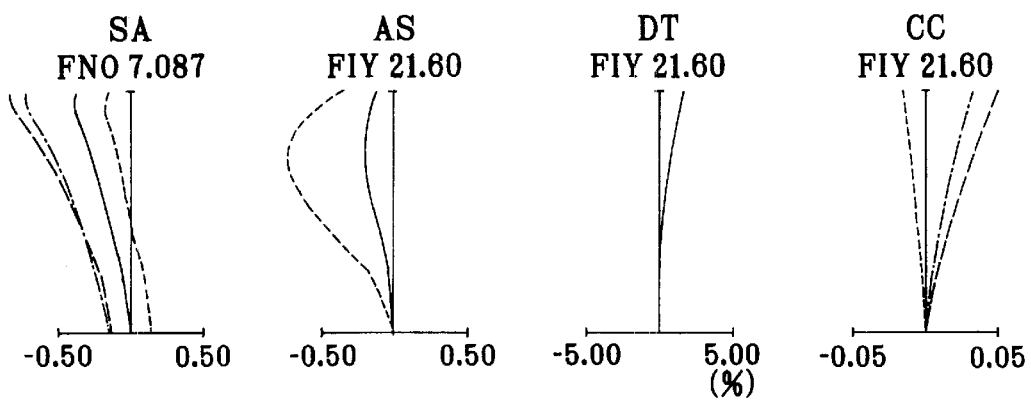
Figure 10C:
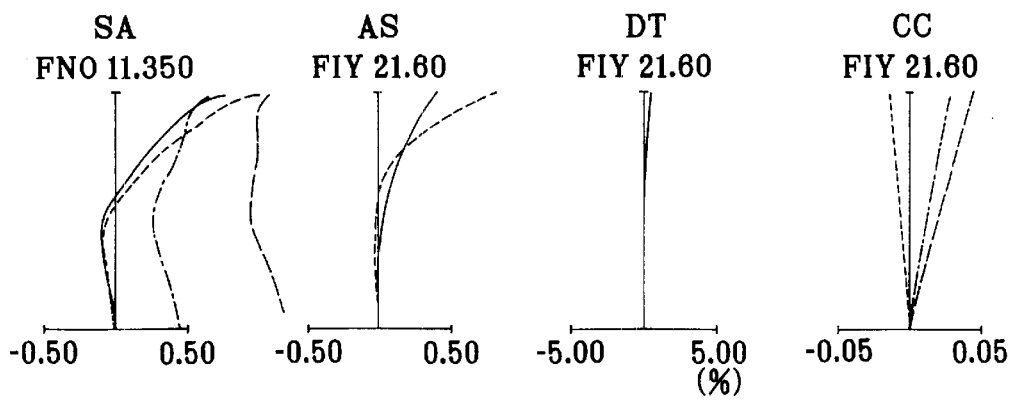
Figure 11A:
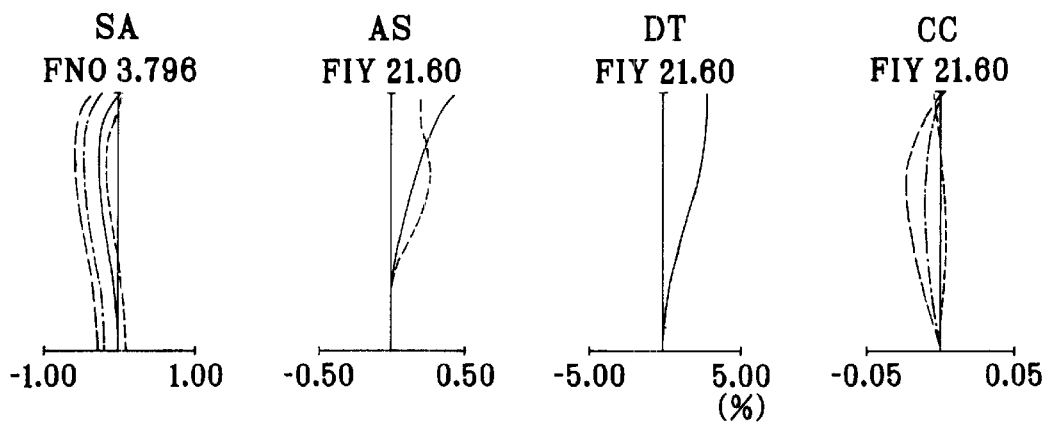
FIGS. 11(a), 11(b) and 11(c) are aberration diagrams for Example 6 upon focused at infinity.
Figure 11B:
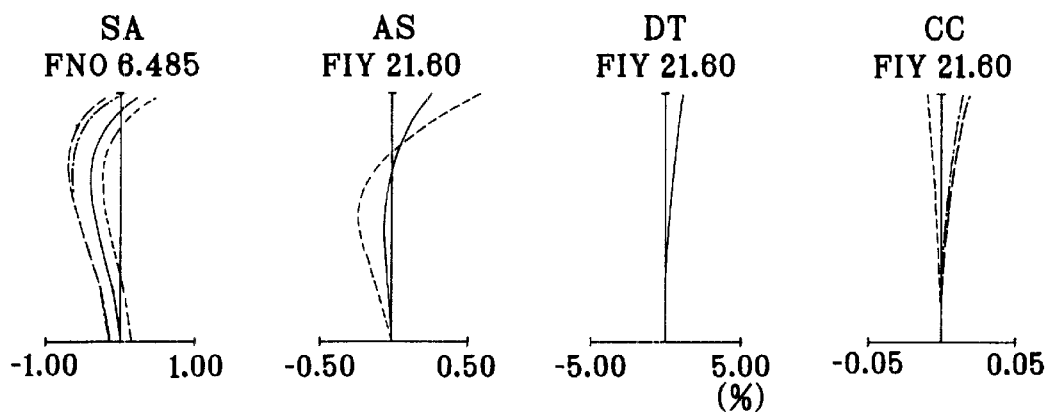
Figure 11C:
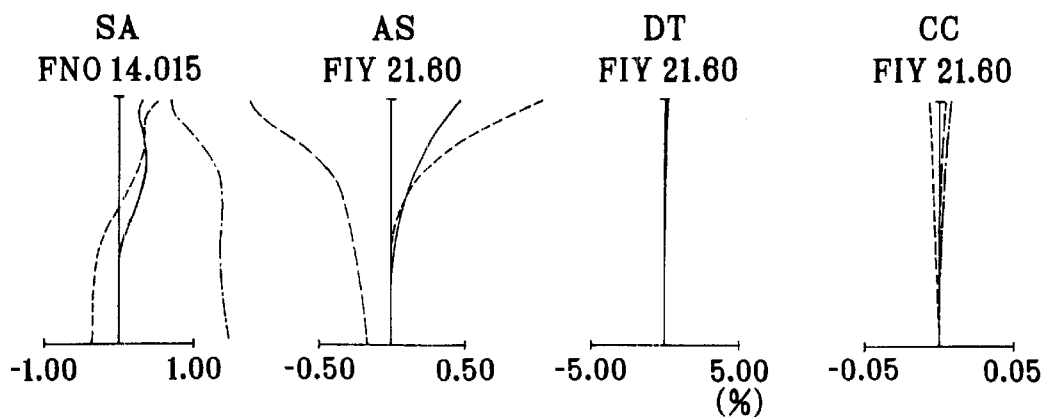
Figure 12A:
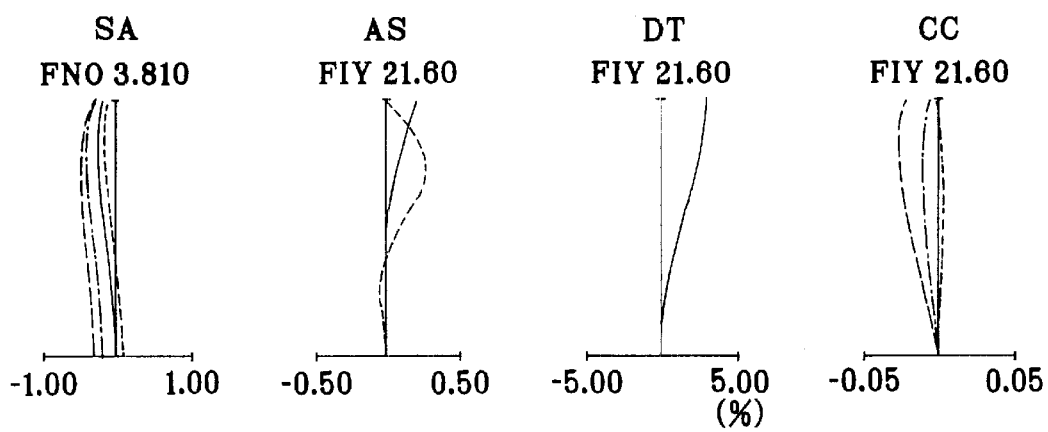
FIGS. 12(a), 12(b) and 12(c) are aberration diagrams for Example 7 upon focused at infinity.
Figure 12B:
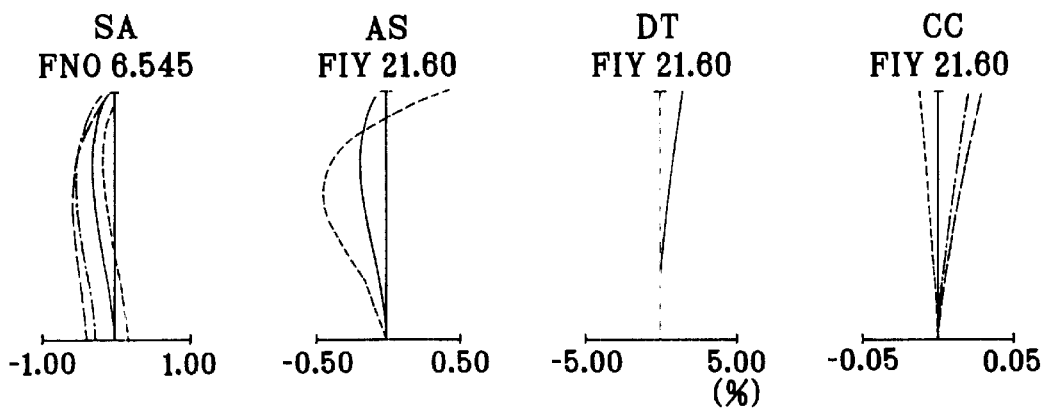
Figure 12C:
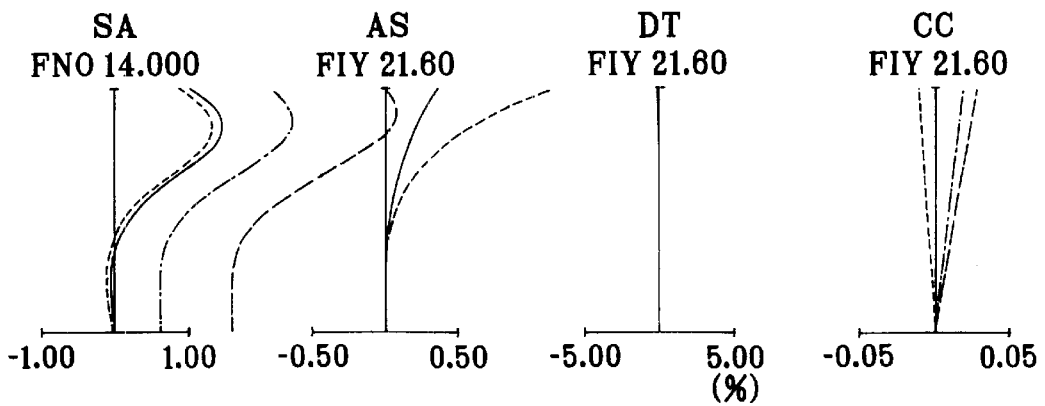
Figure 13A:
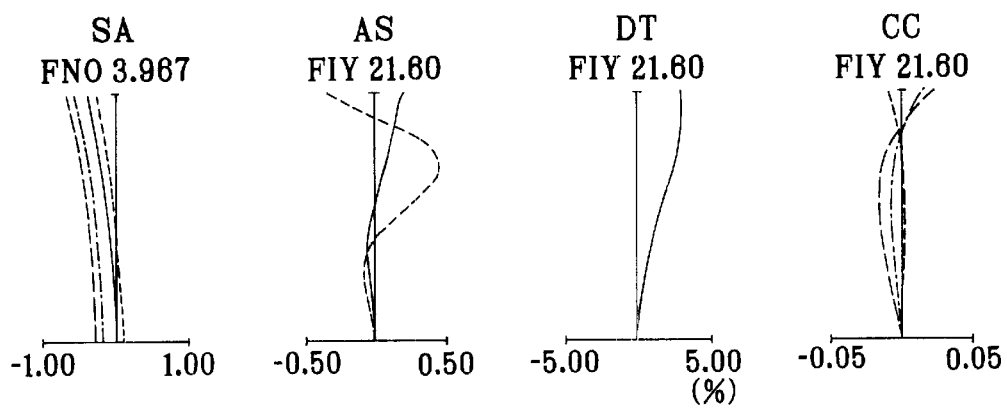
FIGS. 13(a), 13(b) and 13(c) are aberration diagrams for Example 8 upon focused at infinity.
Figure 13B:
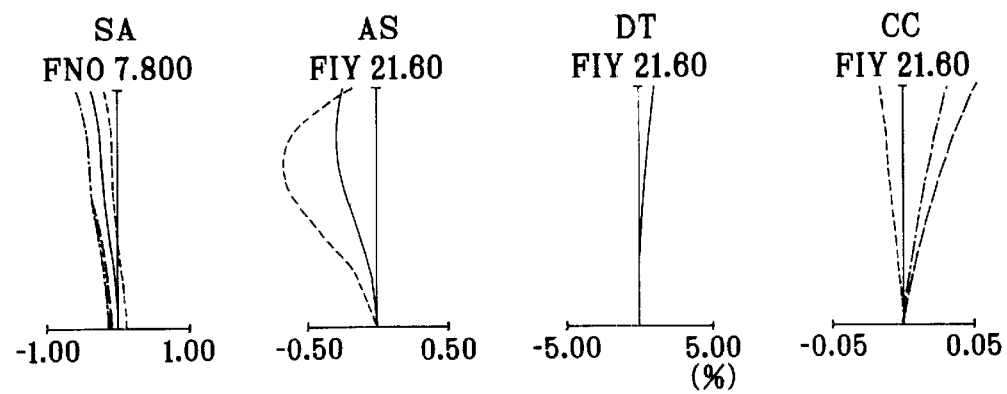
Figure 13C:
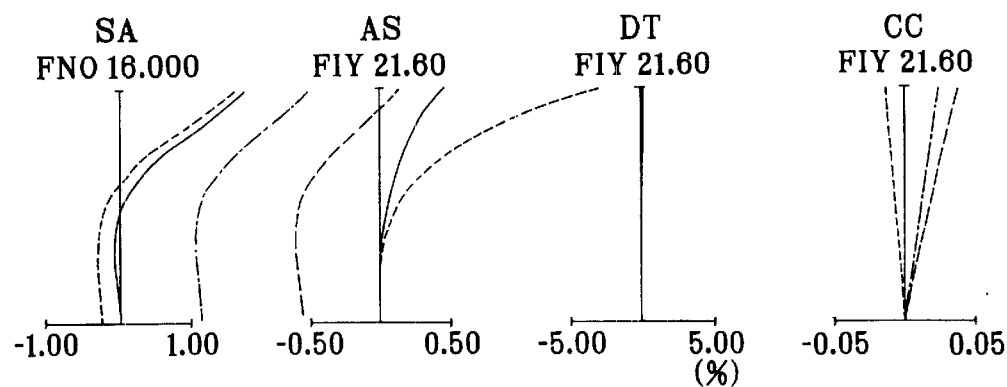
Figure 14A:
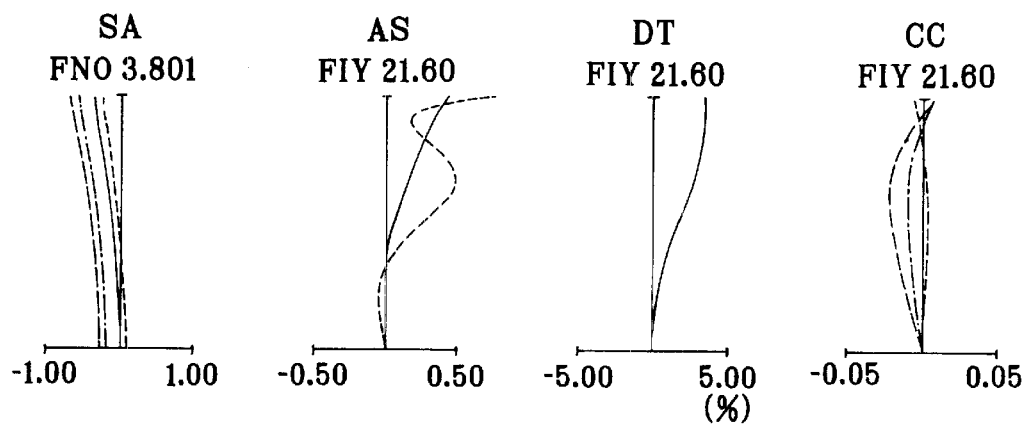
FIGS. 14(a), 14(b) and 14(c) are aberration diagrams for Example 9 upon focused at infinity.
Figure 14B:
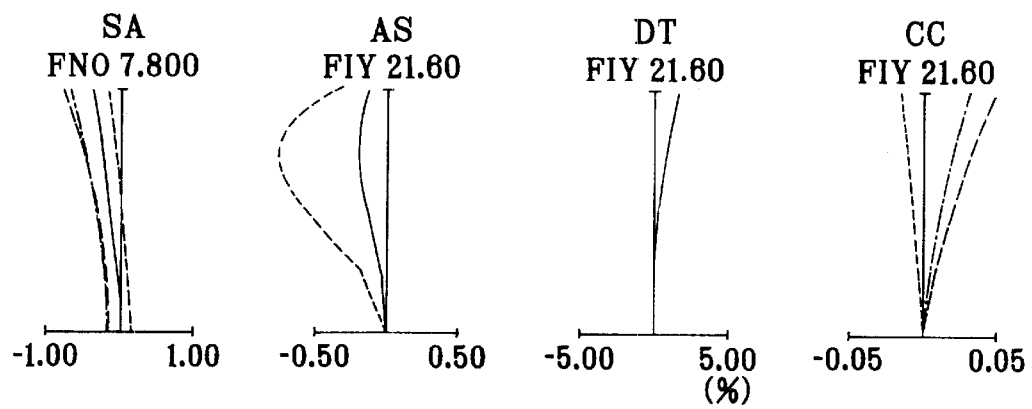
Figure 14C:
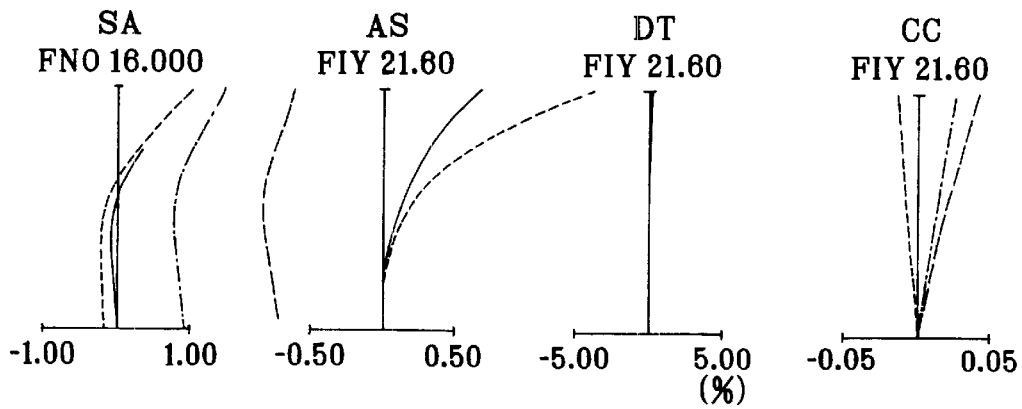

This example is directed to a zoom lens system having a focal length of 39.34 to 110.45 mm and an F-number of 4.14 to 11.63. As shown in FIGS. 2(a) to 2(c), the zoom lens system is composed of a first lens group G1 having positive refracting power and a second lens group G2 having negative refracting power. From the wide-angle end to the telephoto end of the zoom lens system, the first lens group G1, and the second lens group G2 moves toward the object side of the zoom lens system while the space between them becomes narrow.

The first lens group G1 is made up of a front lens unit G1f consisting of a negative meniscus lens convex on an object side thereof and a positive meniscus lens convex on an object side thereof, a rear lens unit G1r composed of a double-convex lens, and an aperture stop. The second lens group G2 is made up of a positive meniscus lens, a negative meniscus lens and a negative meniscus lens, each concave on an object side thereof. Two aspherical surfaces are used; one at the object-side surface of the-positive meniscus lens in the front lens unit G1f in the first lens group G1, and another at the object-side surface of the positive meniscus lens in the second lens group G2.

EXAMPLE 3

This example is directed to a zoom lens system having a focal length of 39.33 to 115.83 mm and an F-number of 3.81 to 11.22. As shown in FIGS. 3(a) to 3(c), the zoom lens system is composed of a first lens group G1 having positive refracting power and a second lens group G2 having negative refracting power. From the wide-angle end to the telephoto end of the zoom lens system, the first lens group G1, and the second lens group G2 moves toward the object side of the zoom lens system while the space between them becomes narrow.

The first lens group Gl is made up of a front lens unit G1f consisting of a negative meniscus lens concave on an object side thereof and a positive meniscus lens convex on an object side thereof, a rear lens unit G1r composed of a doublet consisting of a negative meniscus lens convex on an object side thereof and a double-convex lens, and an aperture stop. The second lens group G2 is made up of a positive meniscus lens, a negative meniscus lens and a negative meniscus lens, each concave on an object side thereof. Two aspherical surfaces are used; one at the object-side surface of the positive meniscus lens in the front lens unit G1f in the first lens group G1, and another at the object-side surface of the positive meniscus lens in the second lens group G2.

EXAMPLE 4

This example is directed to a zoom lens system having a focal length of 36.17 to 103.49 mm and an F-number of 3.97 to 11.35. As shown in FIGS. 4(a) to 4(c), the zoom lens system is composed of a first lens group G1having positive refracting power and a second lens group G2 having negative refracting power. From the wide-angle end to the telephoto end of the zoom lens system, the first lens group G1, and the second lens group G2 moves toward the object side of the zoom lens system while the space between them becomes narrow.

The first lens group G1 is made up of a front lens unit G1f consisting of a negative meniscus lens concave on an object side thereof and a positive meniscus lens convex on an object side thereof, a rear lens unit G1r composed of a doublet consisting of a negative meniscus lens convex on an object side thereof and a double-convex lens, and an aperture stop. The second lens group G2 is made up of a positive meniscus lens, a negative meniscus lens and a negative meniscus lens, each concave on an object side thereof. Two aspherical surfaces are used; one at the object-side surface of the positive meniscus lens in the front lens unit G1f in the first lens group G1, and another at the object-side surface of the positive meniscus lens in the second lens group G2.

EXAMPLE 5

This example is directed to a zoom lens system having a focal length of 36.16 to 107.97 mm and an F-number of 3.80 to 11.35. As shown in FIGS. 5(a) to 5(c), the zoom lens system is composed of a first lens group G1 having positive refracting power and a second lens group G2 having negative refracting power. From the wide-angle end to the telephoto end of the zoom lens system, the first lens group G1, and the second lens group G2 moves toward the object side of the zoom lens system while the space between them becomes narrow.

The first lens group G1 is made up of a front lens unit G1f consisting of a negative meniscus lens concave on an object side thereof and a positive meniscus lens convex on an object side thereof, a rear lens unit G1r composed of a doublet consisting of a negative meniscus lens convex on an object side thereof and a double-convex lens, and an aperture stop. The second lens group G2 is made up of a positive meniscus lens, a negative meniscus lens and a negative meniscus lens, each concave on an object side thereof. Two aspherical surfaces are used; one at the object-side surface of the positive meniscus lens in the front lens unit G1f in the first lens group G1, and another at the object-side surface of the positive meniscus lens in the second lens group G2.

EXAMPLE 6

The instant example is directed to a zoom lens system having a focal length of 39.33 to 148.37 mm and an F-number of 3.80 to 14.32. In the zoom lens system of this example, the space between the lens groups at the telephoto end of Example 1 is made narrow to extend the telephoto end. The power profile, direction of movement, and lens arrangement, of each lens group are the same as in Example 1, and so are not shown.

EXAMPLE 7

The instant example is directed to a zoom lens system having a focal length of 39.33 to 144.50 mm and an F-number of 3.81 to 14.00. In the zoom lens system of this example, the space between the lens groups at the telephoto end of Example 3 is made narrow to extend the telephoto end. The power profile, direction of movement, and lens arrangement, of each lens group are the same as in Example 3, and so are not shown.

EXAMPLE 8

The instant example is directed to a zoom lens system having a focal length of 36.17 to 126.19 mm and an F-number of 3.97 to 16.00. In the zoom lens system of this example, the space between the lens groups at the telephoto end of Example 4 is made narrow to extend the telephoto end. The power profile, direction of movement, and lens arrangement, of each lens group are the same as in Example 4, and so are not shown.

EXAMPLE 9

The instant example is directed to a zoom lens system having a focal length of 36.16 to 126.35 mm and an F-number of 3.80 to 16.00. In the zoom lens system of this example, the space between the lens groups at the telephoto end of Example 5 is made narrow to extend the telephoto end. The power profile, direction of movement, and lens arrangement, of each lens group are the same as in Example 5, and so are not shown.

Set out below are the numerical data on each example. The symbols used hereinafter but not hereinbefore have the following meanings.

f: the focal length of the zoom lens system, $F_{NO}$: F-number, $2\omega$: field angle, FB: back focus, WE: wide-angle end, ST: intermediate settings, TE: telephoto end, $r_1, r_2, \ldots$ the radius of curvature of each lens surface, $d_1, d_2, \ldots$ the space between adjacent lens surfaces, $n_{d1}, n_{d2}, \ldots$ the d-line refractive index of each lens, and $\nu_{d1}, \nu_{d2}, \ldots$ the Abbe number of each lens.

Length is given in mm. Here let x represent an optical axis where the propagation direction of light is positive and y represent a direction perpendicular to the optical axis. Then, the shape of an aspherical surface is given by $$x=(y^2/r)/[1+\{1-(K+1)(y/r)^2\}^{1/2}]+A_4y^4+A_6y^6+A_8y^8+A_{10}y^{10}+A_{12}y^{12}$$

Here r is a paraxial radius of curvature, K is a conical coefficient, and A4, A6, A8, A10 and A12 are the fourth, sixth, eighth, tenth and twelfth aspherical coefficients.

EXAMPLE 1

| | | | |
|---|---|---|---|
| $r_1 = 229.62$ | $d_1 = 1.30$ | $n_{d1} = 1.7283$ | $\nu_{d1} = 28.46$ |
| $r_2 = 46.52$ | $d_2 = 1.00$ | | |
| $r_3 = 28.44$(Aspheric) | $d_3 = 2.30$ | $n_{d2} = 1.5254$ | $\nu_{d2} = 55.78$ |
| $r_4 = 30.39$ | $d_4 = 7.04$ | | |
| $r_5 = 32.03$ | $d_5 = 1.02$ | $n_{d3} = 1.7859$ | $\nu_{d3} = 44.20$ |
| $r_6 = 14.71$ | $d_6 = 4.72$ | $n_{d4} = 1.5225$ | $\nu_{d4} = 59.84$ |
| $r_7 = -14.71$ | $d_7 = 1.20$ | | |
| $r_8 = \infty$ (Stop) | $d_8 = D1$ | | |
| $r_9 = -78.84$(Aspheric) | $d_9 = 2.52$ | $n_{d5} = 1.5254$ | $\nu_{d5} = 55.78$ |
| $r_{10} = -40.65$ | $d_{10} = 2.98$ | | |
| $r_{11} = -23.75$ | $d_{11} = 1.38$ | $n_{d6} = 1.4875$ | $\nu_{d6} = 70.23$ |
| $r_{12} = -38.04$ | $d_{12} = 4.65$ | | |
| $r_{13} = -12.61$ | $d_{13} = 1.71$ | $n_{d7} = 1.6968$ | $\nu_{d7} = 55.53$ |
| $r_{14} = -50.89$ | | | |

Aspherical Coefficients
3rd surface
K = 6.5028
$A_4 = -1.1286 \times 10^{-4}$
$A_6 = -9.3251 \times 10^{-7}$
$A_8 = 3.6782 \times 10^{-9}$
$A_{10} = -7.3820 \times 10^{-11}$
$A_{12} = 0$
9th surface
K = 11.0944
$A_4 = 3.4281 \times 10^{-5}$
$A_6 = 3.3435 \times 10^{-7}$
$A_8 = -1.8047 \times 10^{-10}$
$A_{10} = -1.8363 \times 10^{-11}$
$A_{12} = 1.2456 \times 10^{-13}$

Zooming Data

| | WE | ST | TE |
|---|---|---|---|
| f | 39.33 | 67.19 | 115.80 |
| $F_{NO}$ | 3.80 | 6.48 | 11.18 |
| $2\omega$ (°) | 56.24 | 35.26 | 21.08 |
| F B | 6.99 | 29.83 | 69.67 |
| D 1 | 14.16 | 6.96 | 2.69 |

EXAMPLE 2

| | | | |
|---|---|---|---|
| $r_1 = 250.00$ | $d_1 = 1.30$ | $n_{d1} = 1.7847$ | $\nu_{d1} = 25.68$ |
| $r_2 = 48.65$ | $d_2 = 1.50$ | | |
| $r_3 = 26.88$(Aspheric) | $d_3 = 2.30$ | $n_{d2} = 1.5254$ | $\nu_{d2} = 55.80$ |
| $r_4 = 28.89$ | $d_4 = 5.21$ | | |
| $r_5 = 194.61$ | $d_5 = 3.50$ | $n_{d3} = 1.4875$ | $\nu_{d3} = 70.23$ |
| $r_6 = -12.35$ | $d_6 = 1.20$ | | |
| $r_7 = \infty$ (Stop) | $D_7 = D1$ | | |
| $r_8 = -28.59$(Aspheric) | $d_8 = 2.52$ | $n_{d4} = 1.5254$ | $\nu_{d4} = 55.80$ |
| $r_9 = -20.13$ | $d_9 = 2.52$ | | |
| $r_{10} = -18.16$ | $d_{10} = 1.38$ | $n_{d5} = 1.4875$ | $\nu_{d5} = 70.23$ |
| $r_{11} = -28.62$ | $d_{11} = 3.80$ | | |
| $r_{12} = -12.11$ | $d_{12} = 1.71$ | $n_{d6} = 1.6968$ | $\nu_{d6} = 55.53$ |
| $r_{13} = -31.51$ | | | |

Aspherical Coefficients
3rd surface
K = 6.7270
$A_4 = -1.6855 \times 10^{-4}$
$A_6 = -1.0574 \times 10^{-6}$
$A_8 = -9.4838 \times 10^{-9}$
$A_{10} = -7.2298 \times 10^{-11}$
$A_{12} = 0$
8th surface
K = 7.4399
$A_4 = 7.9041 \times 10^{-6}$
$A_6 = 4.5234 \times 10^{-7}$
$A_8 = -1.7238 \times 10^{-10}$
$A_{10} = 6.0203 \times 10^{-11}$
$A_{12} = -3.1965 \times 10^{-14}$

Zooming Data

| | WE | ST | TE |
|---|---|---|---|
| f | 39.34 | 67.88 | 110.45 |
| $F_{NO}$ | 4.14 | 7.12 | 11.63 |
| $2\omega$ (°) | 56.22 | 35.27 | 22.17 |
| F B | 6.85 | 33.37 | 72.45 |
| D 1 | 16.40 | 7.77 | 3.19 |

EXAMPLE 3

| | | | |
|---|---|---|---|
| $r_1 = -30.00$ | $d_1 = 1.30$ | $n_{d1} = 1.6668$ | $\nu_{d1} = 33.05$ |
| $r_2 = -69.52$ | $d_2 = 1.20$ | | |
| $r_3 = 81.83$(Aspheric) | $d_3 = 2.30$ | $n_{d2} = 1.5842$ | $\nu_{d2} = 30.49$ |
| $r_4 = 136.38$ | $d_4 = 5.61$ | | |
| $r_5 = 31.24$ | $d_5 = 1.04$ | $n_{d3} = 1.8340$ | $\nu_{d3} = 37.16$ |
| $r_6 = 16.00$ | $d_6 = 4.57$ | $n_{d4} = 1.5182$ | $\nu_{d4} = 58.90$ |
| $r_7 = -15.92$ | $d_7 = 1.00$ | | |
| $r_8 = \infty$ (Stop) | $d_8 = D1$ | | |
| $r_9 = -90.30$(Aspheric) | $d_9 = 2.52$ | $n_{d5} = 1.5842$ | $\nu_{d5} = 30.49$ |
| $r_{10} = -50.33$ | $d_{10} = 3.85$ | | |
| $r_{11} = -90.16$ | $d_{11} = 1.38$ | $n_{d6} = 1.6516$ | $\nu_{d6} = 58.55$ |
| $r_{12} = -403.64$ | $d_{12} = 4.45$ | | |
| $r_{13} = -14.12$ | $d_{13} = 1.67$ | $n_{d7} = 1.7292$ | $\nu_{d7} = 54.68$ |
| $r_{14} = -67.39$ | | | |

Aspherical Coefficients
3rd surface
K = 7.5594
$A_4 = -5.6772 \times 10^{-5}$
$A_6 = -5.2870 \times 10^{-7}$
$A_8 = 7.1209 \times 10^{-9}$
$A_{10} = -8.5759 \times 10^{-11}$
$A_{12} = 0$
9th surface
K = 8.3394
$A_4 = 1.7453 \times 10^{-5}$
$A_6 = 9.9323 \times 10^{-8}$
$A_8 = -2.4666 \times 10^{-10}$
$A_{10} = 3.4004 \times 10^{-11}$
$A_{12} = -3.6578 \times 10^{-13}$ -continued

Zooming Data

|    | WE    | ST    | TE     |
|----|-------|-------|--------|
| f        | 39.33 | 67.56 | 115.83 |
| $F_{NO}$ | 3.81  | 6.54  | 11.22  |
| $2\omega\,(°)$ | 56.24 | 35.01 | 21.06 |
| F B      | 6.99  | 30.59 | 70.95  |
| D 1      | 14.49 | 6.66  | 2.11   |

EXAMPLE 4

| | | | |
|---|---|---|---|
| $r_1 = -31.53$ | $d_1 = 1.10$ | $n_{d1} = 1.6668$ | $\nu_{d1} = 33.05$ |
| $r_2 = -77.84$ | $d_2 = 1.10$ | | |
| $r_3 = 106.56$ (Aspheric) | $d_3 = 2.05$ | $n_{d2} = 1.5254$ | $\nu_{d2} = 55.81$ |
| $r_4 = 122.04$ | $d_4 = 5.00$ | | |
| $r_5 = 33.95$ | $d_5 = 0.92$ | $n_{d3} = 1.8340$ | $\nu_{d3} = 37.16$ |
| $r_6 = 17.48$ | $d_6 = 3.77$ | $n_{d4} = 1.5182$ | $\nu_{d4} = 58.90$ |
| $r_7 = -14.24$ | $d_7 = 1.00$ | | |
| $r_8 = \infty$ (Stop) | $d_8 = D1$ | | |
| $r_9 = -29.68$ (Aspheric) | $d_9 = 2.35$ | $n_{d5} = 1.5254$ | $\nu_{d5} = 55.81$ |
| $r_{10} = -27.39$ | $d_{10} = 5.04$ | | |
| $r_{11} = -26.39$ | $d_{11} = 1.31$ | $n_{d6} = 1.5163$ | $\nu_{d6} = 64.14$ |
| $r_{12} = -37.75$ | $d_{12} = 3.75$ | | |
| $r_{13} = -14.50$ | $d_{13} = 1.62$ | $n_{d7} = 1.7292$ | $\nu_{d7} = 54.68$ |
| $r_{14} = -54.38$ | | | |

Aspherical Coefficients
3rd surface
K = 7.5594
$A_4 = -9.1595 \times 10^{-5}$
$A_6 = -9.1569 \times 10^{-7}$
$A_8 = 1.7094 \times 10^{-8}$
$A_{10} = -2.5636 \times 10^{-10}$
$A_{12} = 0$
9th surface
K = 8.3392
$A_4 = 6.5726 \times 10^{-5}$
$A_6 = 1.7278 \times 10^{-7}$
$A_8 = -2.4038 \times 10^{-10}$
$A_{10} = 1.1693 \times 10^{-10}$
$A_{12} = -4.6672 \times 10^{-13}$

Zooming Data

|    | WE    | ST    | TE     |
|----|-------|-------|--------|
| f        | 36.17 | 67.35 | 103.49 |
| $F_{NO}$ | 3.97  | 7.39  | 11.35  |
| $2\omega\,(°)$ | 60.27 | 35.23 | 23.52 |
| F B      | 4.39  | 30.93 | 61.68  |
| D 1      | 15.50 | 6.84  | 3.33   |

EXAMPLE 5

| | | | |
|---|---|---|---|
| $r_1 = -22.77$ | $d_1 = 1.10$ | $n_{d1} = 1.7408$ | $\nu_{d1} = 27.79$ |
| $r_2 = -37.64$ | $d_2 = 1.10$ | | |
| $r_3 = 110.92$ (Aspheric) | $d_3 = 2.05$ | $n_{d2} = 1.5254$ | $\nu_{d2} = 55.81$ |
| $r_4 = 229.11$ | $d_4 = 4.00$ | | |
| $r_5 = 62.19$ | $d_5 = 0.79$ | $n_{d3} = 1.8340$ | $\nu_{d3} = 37.16$ |
| $r_6 = 27.86$ | $d_6 = 3.45$ | $n_{d4} = 1.5182$ | $\nu_{d4} = 58.90$ |
| $r_7 = -13.43$ | $d_7 = 1.00$ | | |
| $r_8 = \infty$ (Stop) | $d_8 = D1$ | | |
| $r_9 = -32.02$ (Aspheric) | $d_9 = 2.35$ | $n_{d5} = 1.5254$ | $\nu_{d5} = 55.81$ |
| $r_{10} = -28.02$ | $d_{10} = 4.28$ | | |
| $r_{11} = -26.05$ | $d_{11} = 1.31$ | $n_{d6} = 1.5163$ | $\nu_{d6} = 64.14$ |
| $r_{12} = -37.64$ | $d_{12} = 3.75$ | | |
| $r_{13} = -14.50$ | $d_{13} = 1.62$ | $n_{d7} = 1.7292$ | $\nu_{d7} = 54.68$ |
| $r_{14} = -61.14$ | 3.89 | | |

Aspherical Coefficients
3rd surface
K = 7.5594
$A_4 = -1.0371 \times 10^{-4}$
$A_6 = -7.8770 \times 10^{-7}$
$A_8 = 1.1867 \times 10^{-8}$
$A_{10} = -2.4625 \times 10^{-10}$
$A_{12} = 0$
9th surface
K = 8.3393
$A_4 = 6.1247 \times 10^{-5}$
$A_6 = 4.2495 \times 10^{-8}$
$A_8 = -2.4386 \times 10^{-10}$
$A_{10} = 1.1753 \times 10^{-10}$
$A_{12} = -7.7475 \times 10^{-13}$

Zooming Data

|    | WE    | ST    | TE     |
|----|-------|-------|--------|
| f        | 36.16 | 67.41 | 107.97 |
| $F_{NO}$ | 3.80  | 7.09  | 11.35  |
| $2\omega\,(°)$ | 60.05 | 35.01 | 22.52 |
| F B      | 3.89  | 29.50 | 62.74  |
| D 1      | 17.00 | 8.31  | 4.53   |

EXAMPLE 6

| | | | |
|---|---|---|---|
| $r_1 = 229.62$ | $d_1 = 1.30$ | $n_{d1} = 1.7283$ | $\nu_{d1} = 28.46$ |
| $r_2 = 46.52$ | $d_2 = 1.00$ | | |
| $r_3 = 28.44$ (Aspheric) | $d_3 = 2.30$ | $n_{d2} = 1.5254$ | $\nu_{d2} = 55.78$ |
| $r_4 = 30.39$ | $d_4 = 7.04$ | | |
| $r_5 = 32.03$ | $d_5 = 1.02$ | $n_{d3} = 1.7859$ | $\nu_{d3} = 44.20$ |
| $r_6 = 14.71$ | $d_6 = 4.72$ | $n_{d4} = 1.5225$ | $\nu_{d4} = 59.84$ |
| $r_7 = -14.71$ | $d_7 = 1.20$ | | |
| $r_8 = \infty$ (Stop) | $d_8 = D1$ | | |
| $r_9 = -78.84$ (Aspheric) | $d_9 = 2.52$ | $n_{d5} = 1.5254$ | $\nu_{d5} = 55.78$ |
| $r_{10} = -40.65$ | $d_{10} = 2.98$ | | |
| $r_{11} = -23.75$ | $d_{11} = 1.38$ | $n_{d6} = 1.4875$ | $\nu_{d6} = 70.23$ |
| $r_{12} = -38.04$ | $d_{12} = 4.65$ | | |
| $r_{13} = -12.61$ | $d_{13} = 1.71$ | $n_{d7} = 1.6968$ | $\nu_{d7} = 55.53$ |
| $r_{14} = -50.89$ | | | |

Aspherical Coefficients
3rd surface
K = 6.5028
$A_4 = -1.1286 \times 10^{-4}$
$A_6 = -9.3251 \times 10^{-7}$
$A_8 = 3.6782 \times 10^{-9}$
$A_{10} = -7.3820 \times 10^{-11}$
$A_{12} = 0$
9th surface
K = 11.0944
$A_4 = 3.4281 \times 10^{-5}$
$A_6 = 3.3435 \times 10^{-7}$
$A_8 = -1.8047 \times 10^{-10}$
$A_{10} = -1.8363 \times 10^{-11}$
$A_{12} = 1.2456 \times 10^{-13}$

Zooming Data

|    | WE    | ST    | TE     |
|----|-------|-------|--------|
| f        | 39.33 | 67.19 | 148.37 |
| $F_{NO}$ | 3.80  | 6.48  | 14.32  |
| $2\omega\,(°)$ | 56.24 | 35.26 | 16.55 |
| F B      | 6.99  | 29.83 | 96.37  |
| D 1      | 14.16 | 6.96  | 1.40   |

EXAMPLE 7

| | | | |
|---|---|---|---|
| $r_1 = -30.00$ | $d_1 = 1.30$ | $n_{d1} = 1.6668$ | $\nu_{d1} = 33.05$ |
| $r_2 = -69.52$ | $d_2 = 1.20$ | | |
| $r_3 = 81.83$(Aspheric) | $d_3 = 2.30$ | $n_{d2} = 1.5842$ | $\nu_{d2} = 30.49$ |
| $r_4 = 136.38$ | $d_4 = 5.61$ | | |
| $r_5 = 31.24$ | $d_5 = 1.04$ | $n_{d3} = 1.8340$ | $\nu_{d3} = 37.16$ |
| $r_6 = 16.00$ | $d_6 = 4.57$ | $n_{d4} = 1.5182$ | $\nu_{d4} = 58.90$ |
| $r_7 = -15.92$ | $d_7 = 1.00$ | | |
| $r_8 = \infty$ (Stop) | $d_8 = D1$ | | |
| $r_9 = -90.30$(Aspheric) | $d_9 = 2.52$ | $n_{d5} = 1.5842$ | $\nu_{d5} = 30.49$ |
| $r_{10} = -50.33$ | $d_{10} = 3.85$ | | |
| $r_{11} = -90.16$ | $d_{11} = 1.38$ | $n_{d6} = 1.6516$ | $\nu_{d6} = 58.55$ |
| $r_{12} = -403.64$ | $d_{12} = 4.45$ | | |
| $r_{13} = -14.12$ | $d_{13} = 1.67$ | $n_{d7} = 1.7292$ | $\nu_{d7} = 54.68$ |
| $r_{14} = -67.39$ | | | |

Aspherical Coefficients
3rd surface
$K = 7.5594$
$A_4 = -5.6772 \times 10^{-5}$
$A_6 = -5.2870 \times 10^{-7}$
$A_8 = 7.1209 \times 10^{-9}$
$A_{10} = -8.5759 \times 10^{-11}$
$A_{12} = 0$
9th surface
$K = 8.3394$
$A_4 = 1.7453 \times 10^{-5}$
$A_6 = 9.9323 \times 10^{-8}$
$A_8 = -2.4666 \times 10^{-10}$
$A_{10} = 3.4004 \times 10^{-11}$
$A_{12} = -3.6578 \times 10^{-13}$

Zooming Data

| | WE | ST | TE |
|---|---|---|---|
| f | 39.33 | 67.56 | 144.50 |
| $F_{NO}$ | 3.81 | 6.54 | 14.00 |
| $2\omega\,(°)$ | 56.24 | 35.01 | 16.98 |
| F B | 6.99 | 30.59 | 94.93 |
| D 1 | 14.49 | 6.66 | 0.85 |

EXAMPLE 8

| | | | |
|---|---|---|---|
| $r_1 = -31.53$ | $d_1 = 1.10$ | $n_{d1} = 1.6668$ | $\nu_{d1} = 33.05$ |
| $r_2 = -77.84$ | $d_2 = 1.10$ | | |
| $r_3 = 106.56$(Aspheric) | $d_3 = 2.05$ | $n_{d2} = 1.5254$ | $\nu_{d2} = 55.81$ |
| $r_4 = 122.04$ | $d_4 = 5.00$ | | |
| $r_5 = 33.95$ | $d_5 = 0.92$ | $n_{d3} = 1.8340$ | $\nu_{d3} = 37.16$ |
| $r_6 = 17.48$ | $d_6 = 3.77$ | $n_{d4} = 1.5182$ | $\nu_{d4} = 58.90$ |
| $r_7 = -14.24$ | $d_7 = 1.00$ | | |
| $r_8 = \infty$ (Stop) | $d_8 = D1$ | | |
| $r_9 = -29.68$(Aspheric) | $d_9 = 2.35$ | $n_{d5} = 1.5254$ | $\nu_{d5} = 55.81$ |
| $r_{10} = -27.39$ | $d_{10} = 5.04$ | | |
| $r_{11} = -26.39$ | $d_{11} = 1.31$ | $n_{d6} = 1.5163$ | $\nu_{d6} = 64.14$ |
| $r_{12} = -37.75$ | $d_{12} = 3.75$ | | |
| $r_{13} = -14.50$ | $d_{13} = 1.62$ | $n_{d7} = 1.7292$ | $\nu_{d7} = 54.68$ |
| $r_{14} = -54.38$ | | | |

Aspherical Coefficients
3rd surface
$K = 7.5594$
$A_4 = -9.1595 \times 10^{-5}$
$A_6 = -9.1569 \times 10^{-7}$
$A_8 = 1.7094 \times 10^{-8}$
$A_{10} = -2.5636 \times 10^{-10}$
$A_{12} = 0$
9th surface
$K = 8.3392$
$A_4 = 6.5726 \times 10^{-5}$
$A_6 = 1.7278 \times 10^{-7}$
$A_8 = -2.4038 \times 10^{-10}$
$A_{10} = 1.1693 \times 10^{-10}$
$A_{12} = -4.6672 \times 10^{-13}$

Zooming Data

| | WE | ST | TE |
|---|---|---|---|
| f | 36.17 | 67.35 | 126.19 |
| $F_{NO}$ | 3.97 | 7.80 | 16.00 |
| $2\omega\,(°)$ | 60.27 | 35.23 | 19.40 |
| F B | 4.39 | 30.93 | 81.00 |
| D 1 | 15.50 | 6.84 | 2.15 |

EXAMPLE 9

| | | | |
|---|---|---|---|
| $r_1 = -22.77$ | $d_1 = 1.10$ | $n_{d1} = 1.7408$ | $\nu_{d1} = 27.79$ |
| $r_2 = -37.64$ | $d_2 = 1.10$ | | |
| $r_3 = 110.92$(Aspheric) | $d_3 = 2.05$ | $n_{d2} = 1.5254$ | $\nu_{d2} = 55.81$ |
| $r_4 = 229.11$ | $d_4 = 4.00$ | | |
| $r_5 = 62.19$ | $d_5 = 0.79$ | $n_{d3} = 1.8340$ | $\nu_{d3} = 37.16$ |
| $r_6 = 27.86$ | $d_6 = 3.45$ | $n_{d4} = 1.5182$ | $\nu_{d4} = 58.90$ |
| $r_7 = -13.43$ | $d_7 = 1.00$ | | |
| $r_8 = \infty$ (Stop) | $d_8 = D1$ | | |
| $r_9 = -32.02$(Aspheric) | $d_9 = 2.35$ | $n_{d5} = 1.5254$ | $\nu_{d5} = 55.81$ |
| $r_{10} = -28.02$ | $d_{10} = 4.28$ | | |
| $r_{11} = -26.05$ | $d_{11} = 1.31$ | $n_{d6} = 1.5163$ | $\nu_{d6} = 64.14$ |
| $r_{12} = -37.64$ | $d_{12} = 3.75$ | | |
| $r_{13} = -14.50$ | $d_{13} = 1.62$ | $n_{d7} = 1.7292$ | $\nu_{d7} = 54.68$ |
| $r_{14} = -61.14$ | | | |

Aspherical Coefficients
3rd surface
$K = 7.5594$
$A_4 = -1.0371 \times 10^{-4}$
$A_6 = -7.8770 \times 10^{-7}$
$A_8 = 1.1867 \times 10^{-8}$
$A_{10} = -2.4625 \times 10^{-10}$
$A_{12} = 0$
9th surface
$K = 8.3393$
$A_4 = 6.1247 \times 10^{-5}$
$A_6 = 4.2495 \times 10^{-8}$
$A_8 = -2.4386 \times 10^{-10}$
$A_{10} = 1.1753 \times 10^{-10}$
$A_{12} = -7.7475 \times 10^{-13}$

Zooming Data

| | WE | ST | TE |
|---|---|---|---|
| f | 36.16 | 67.41 | 126.35 |
| $F_{NO}$ | 3.80 | 7.80 | 16.00 |
| $2\omega\,(°)$ | 60.05 | 35.01 | 19.34 |
| F B | 3.89 | 29.50 | 77.79 |
| D 1 | 17.00 | 8.31 | 3.62 |

FIGS. 6(a), 6(b) and 6(c) through 14(a), 14(b) and 14(c) are aberration diagrams for Examples 1 through 9 upon focused at infinity. In these figures, (a), (b) and (c) show aberrations at the wide-angle ends, intermediate settings, and telephoto ends, respectively, and SA, AS, DT, CC and FIY represent spherical aberrations, astigmatism, distortion, chromatic aberrations of magnification, and image height, respectively.

Enumerated below are the values of conditions (1) to (4) and zoom ratios in Examples 1 to 9.

| Condition | (1) | (2) | (3) | (4) | Zoom Ratio |
|---|---|---|---|---|---|
| Example 1 | 1.35 | 5.66 | 1.99 | 1.01 | 2.94 |
| Example 2 | 1.06 | 3.86 | 2.47 | 1.01 | 2.81 |
| Example 3 | 1.64 | 7.19 | 1.07 | 1.2 | 2.95 |
| Example 4 | 4.82 | 7.37 | 2.25 | 1.01 | 2.86 |
| Example 5 | 3.28 | 7.23 | 2.25 | 1.01 | 2.99 |
| Example 6 | 1.05 | 5.66 | 1.99 | 1.01 | 3.77 |
| Example 7 | 1.32 | 7.19 | 1.07 | 1.2 | 3.67 |
| Example 8 | 3.95 | 7.37 | 2.25 | 1.01 | 3.49 |
| Example 9 | 2.81 | 7.23 | 2.25 | 1.01 | 3.49 |

Figure 15:
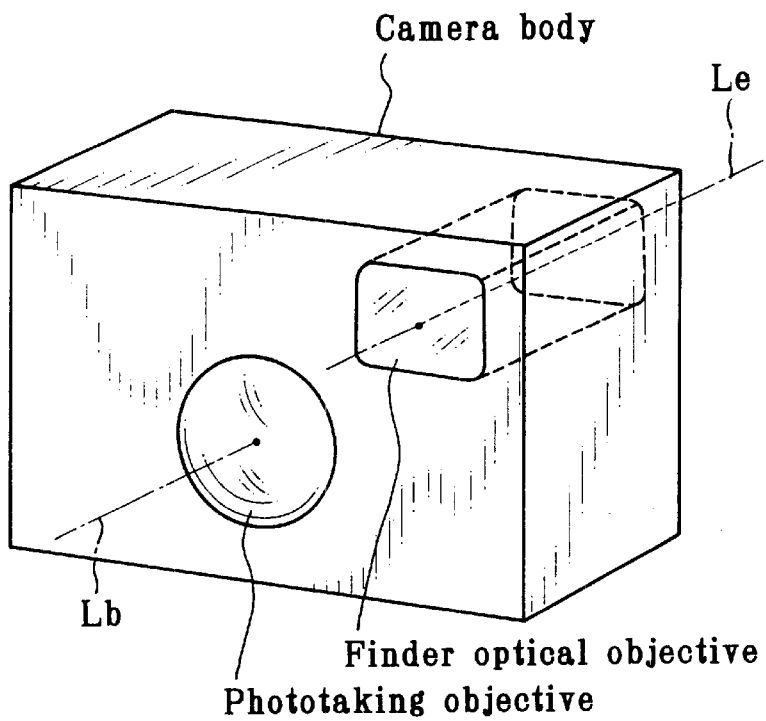
FIG. 15 is a perspective view illustrative of one construction of the compact camera with which the zoom lens system of the invention is used.
Figure 16:
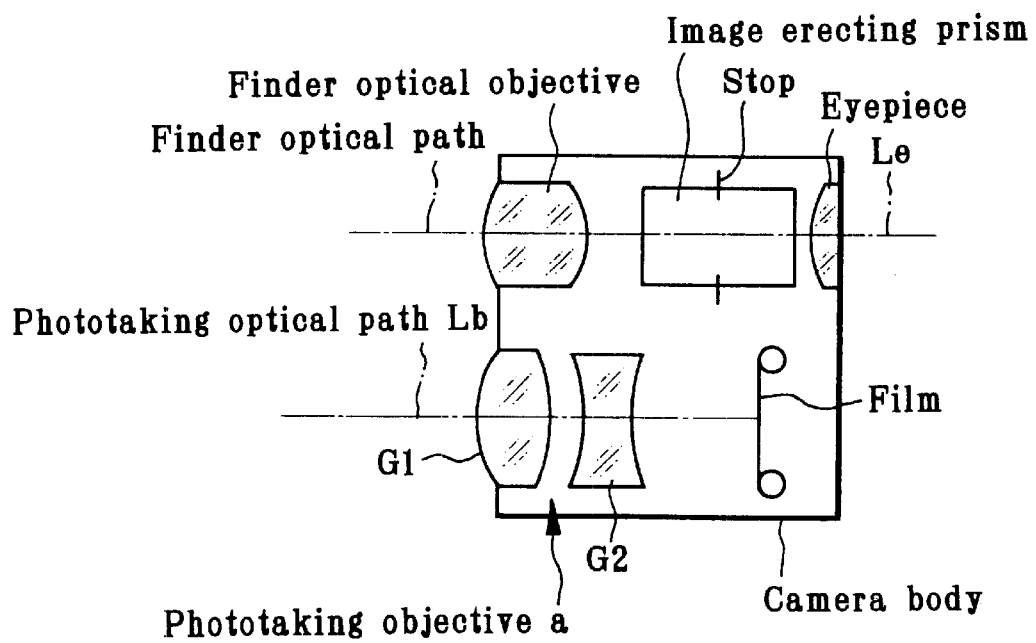
FIG. 16 is a sectional schematic illustrative of the construction of the compact camera of FIG. 15.

Such a zoom lens as described above may be used as a phototaking objective lens a for a compact camera, one example of which is shown in the perspective view of FIG. 15 and the sectional view of FIG. 16, wherein G1 is the first lens group having positive refracting power and G2 is the second lens group having negative refracting power. In FIG. 15 and 16, $L_b$ and $L_e$ stand for a phototaking optical path and a finder optical path, respectively. The phototaking optical path $L_b$ is parallel to the finder optical path $L_e$. A subject image is observed through a finder comprising a finder objective, an image erecting prism, a stop and an eyepiece, and is formed on film via the phototaking objective lens a.

The zoom lens of the present invention may also be used as a phototaking objective lens for a compact electronic camera wherein an electronic image pickup device such as a CCD is used in place of film.

As detailed above and as can be seen from each example, the present invention can provide a compact, low-cost zoom lens system comprising a positive lens group and a negative lens group, wherein a plastic lens is used.

What we claim is:

1. A zoom lens system comprising, in order from an object side of the zoom lens system, a first lens group having positive refracting power and a second lens group having negative refracting power, wherein:
   said second lens group comprises, in order from an object side thereof, a positive lens component 2-1, a negative lens component 2-2 and a negative lens component 2-3, with said lens component 2-1 comprising a plastic lens element, and
   said second lens group satisfies the following conditions (1) and (2):

$$1.05 \leq f_{21}/f_T < 5 \quad (1)$$

$$3.8 < f_{22}/f_{G2} < 8 \quad (2)$$

where $f_{21}$ is a focal length of said lens component 2-1 in said second lens group, $f_{22}$ is a focal length of said lens component 2-2 in said second lens group, $f_T$ is a focal length of said zoom lens system at a telephoto end thereof, and $f_{G2}$ is a composite focal length of said second lens group.

2. The zoom lens system according to claim 1, wherein said first lens group comprises, in order from an object side thereof, a front lens unit comprising a negative lens component 1-1 and a positive lens component 1-2 and having negative refracting power and a rear lens unit comprising a positive lens component, said lens component 1-2 being a plastic lens component including an aspherical surface whose off-axis power is smaller than axial power.

3. The zoom lens system according to claim 1 or 2, which further satisfies the following condition (3):

$$1 < (R_{22r}+R_{23f})/(R_{22r}-R_{23f}) < 2.5 \quad (3)$$

where $R_{22r}$ is an image-side radius of curvature of said lens component 2-2 in said second lens group, and $R_{23f}$ is the object-side radius of curvature of said lens 2-3 component in said second lens group.

4. A zoom lens system comprising, in order from an object side of the zoom lens system, a first lens group having positive refracting power and a second lens group having negative refracting power, wherein:
   said second lens group comprises, in order from an object side thereof, a positive lens component 2-1, a negative lens component 2-2 and a negative lens component 2-3, with said lens component 2-1 comprising a plastic lens element, and
   said second lens group satisfies the following conditions (1), (2) and (4):

$$1.05 \leq f_{21}/f_T < 5 \quad (1)$$

$$3.8 < f_{22}/f_{G2} < 8 \quad (2)$$

$$1.01 \leq S_{G21} < 1.24 \quad (4)$$

where $f_{21}$ is a focal length of said lens component 2-1 in said second lens group, $f_{22}$ is a focal length of said lens component 2-2 in said second lens group, $f_T$ is a focal length of said zoom lens system at a telephoto end thereof, $f_{G2}$ is a composite focal length of said second lens group, and $S_{G21}$ is a specific gravity of said lens component 2-1 in said second lens group.

5. The zoom lens system according to claim 1 or 4, wherein said positive lens component 2-1 is only one positive lens component in said second lens group, and is disposed nearest to an object side of said second lens group.

6. The zoom lens system according to claim 2, wherein said positive lens component 1-2 is designed to correct fluctuations of focal length with temperature changes within the same.

7. The zoom lens system according to claim 2, wherein said front lens unit in said first lens group consists of, in order from an object side thereof, a negative meniscus lens element and a positive meniscus lens element convex on an object side thereof.

8. The zoom lens system according to claim 2 or 7, wherein said rear lens unit in said first lens group consists of a positive double-convex lens component.

9. The zoom lens system according to claim 1, 2 or 4, wherein said second lens group consists of, in order from an object side thereof, a positive meniscus lens element concave on an object side thereof, a negative lens element concave on an object side thereof and a negative meniscus lens element concave on an object side thereof.

10. The zoom lens system according to claim 2, wherein an object-side surface of said lens component 1-2 in said first lens group and an object-side surface of said positive lens component 2-1 in said second lens group are defined by aspherical surfaces.

11. The zoom lens system according to claim 2, wherein a surface of said positive lens component 1-2 in said first lens group, said surface being disposed on the object side of said first lens group, is defined by said aspherical surface that has positive power on an optical axis and is configured in such a way as to have a point of inflexion on section including said optical axis.

12. The zoom lens system according to claim 1, 2 or 4, wherein between said first lens group and said second lens group there is disposed a stop that moves together with said first lens group during zooming.

13. The zoom lens system according to claim 1, 2 or 3, wherein upon zooming from a wide-angle end to a telephoto end of said zoom lens system, said first lens group, and said second lens group moves toward the object side of said zoom lens system with a varying space therebetween.

14. The zoom lens system according to claim 1, 2 or 4, wherein of lens groups comprising lenses, only said first and second lens groups move upon zooming from the wide-angle end to the telephoto end, with a zoom ratio of 2.5 or greater.

15. The zoom lens system according to claim 14, wherein said zoom ratio is 3.1 or greater.

16. An image pickup system wherein the zoom lens system according to claim 1, 2 or 4 is used as an image pickup system and a viewing device to observe an image formed by said zoom lens system is provided.

* * * * *